United States Patent
Hirose

(10) Patent No.: US 9,552,241 B2
(45) Date of Patent: Jan. 24, 2017

(54) INFORMATION PROCESSING APPARATUS, METHOD OF INFORMATION PROCESSING, AND RECORDING MEDIUM HAVING STORED THEREIN PROGRAM FOR INFORMATION PROCESSING

(71) Applicant: FUJITSU LIMITED, Kawasaki-shi, Kanagawa (JP)

(72) Inventor: Motoyoshi Hirose, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 237 days.

(21) Appl. No.: 14/266,916

(22) Filed: May 1, 2014

(65) Prior Publication Data

US 2014/0237288 A1 Aug. 21, 2014

Related U.S. Application Data

(63) Continuation of application No. PCT/JP2011/075967, filed on Nov. 10, 2011.

(51) Int. Cl.
*G06F 11/00* (2006.01)
*G06F 11/07* (2006.01)
(Continued)

(52) U.S. Cl.
CPC ....... *G06F 11/0721* (2013.01); *G06F 11/1417* (2013.01); *G06F 11/1425* (2013.01);
(Continued)

(58) Field of Classification Search
CPC ... G06F 11/2023; G06F 11/2041; G06F 11/20; G06F 11/1417
See application file for complete search history.

(56) References Cited

U.S. PATENT DOCUMENTS

| 6,401,177 B1 | 6/2002 | Koike | |
|---|---|---|---|
| 2005/0097208 A1* | 5/2005 | Chu | ..................... G06F 11/1666 709/224 |

(Continued)

FOREIGN PATENT DOCUMENTS

| JP | 57-074898 | 5/1982 |
|---|---|---|
| JP | 11-312120 | 11/1999 |

(Continued)

OTHER PUBLICATIONS

International Search Report, mailed in connection with PCT/JP2011/075967 and mailed Feb. 14, 2012.

(Continued)

*Primary Examiner* — Charles Ehne
(74) *Attorney, Agent, or Firm* — Fujitsu Patent Center

(57) ABSTRACT

An information processing apparatus includes: processors each having a memories and a memory controller that controls the memories; a normality checker that checks whether the processors operate normally when started; a failure detector that finds any failed processor from a result of the check; a fallback unit that falls back a failed processor if any; a redundancy determiner that determines whether the memories are used in a redundancy configuration; a redundancy cancellation determiner that determines, when the memories are determined to be used in the redundant configuration, whether the redundancy configuration of the memories is to be cancelled; and a redundancy canceller that cancels, when the redundancy configuration of the memories is to be cancelled, the redundancy configuration of the memories in at least one processor operating normally.

15 Claims, 23 Drawing Sheets

(51) Int. Cl.
*G06F 11/14* (2006.01)
*G06F 11/20* (2006.01)
*G06F 11/16* (2006.01)
*G06F 12/06* (2006.01)

(52) U.S. Cl.
CPC .......... *G06F 11/1666* (2013.01); *G06F 11/20* (2013.01); *G06F 11/2023* (2013.01); *G06F 11/2028* (2013.01); *G06F 11/2035* (2013.01); *G06F 11/2041* (2013.01); *G06F 11/2043* (2013.01); *G06F 12/06* (2013.01)

(56) References Cited

U.S. PATENT DOCUMENTS

2006/0015773 A1* 1/2006 Singh .................. G06F 11/2046
714/13
2008/0271054 A1 10/2008 Allison
2010/0153663 A1 6/2010 Sugano et al.
2011/0191627 A1* 8/2011 Koning .................. G06F 11/20
714/5.1
2014/0317441 A1* 10/2014 Arata ...................... G06F 11/20
714/4.12

FOREIGN PATENT DOCUMENTS

| JP | 2009-514064 | 4/2009 |
| JP | 2009-199478 | 9/2009 |
| WO | 2007-017399 | 2/2007 |
| WO | 2009-034652 | 3/2009 |

OTHER PUBLICATIONS

Extended European Search Report dated May 13, 2015 for corresponding European Patent Application No. 11875384.7, 6 pages.
Lala, Jaynarayan, "Fault Detection, Isolation, and Reconfiguration in the Fault Tolerant Multiprocessor," Journal of Guidance and Control and Dynamics, AIAA, Reston, VA, US, vol. 9, No. 5, Sep. 1, 1986, pp. 585-592, XP000715939.

* cited by examiner

FIG. 4

| | bit number | remark |
|---|---|---|
| memory mirroring flag | 1 | 1: mirroring memory  0: not mirroring memory |
| memory-mirroring cancelling flag for CPU fallback | 1 | 1: cancelling  0: not cancelling |
| size adjusting flag when memory mirroring is cancelled | 1 | 1: adjusting size after memory mirroring is cancelled<br>0: not adjusting size after memory mirroring is cancelled |

FIG. 13

| Flag | value |
|---|---|
| memory mirroring flag | 1 |
| memory-mirroring cancelling flag for CPU fall back | 1 |

FIG. 14

| component | presence flag | normal flag | memory mirroring flag | component | presence flag | normal flag | memory mirroring flag |
|---|---|---|---|---|---|---|---|
| CPU0 | 1 | 1 | 1 | CPU1 | 1 | 1 | 1 |
| component | presence flag | normal flag | used flag | component | presence flag | normal flag | used flag |
| DIMM 000 | 1 | 1 | 1 | DIMM 100 | 1 | 1 | 1 |
| DIMM 001 | 1 | 1 | 1 | DIMM 101 | 1 | 1 | 1 |
| DIMM 002 | 1 | 1 | 1 | DIMM 102 | 1 | 1 | 1 |
| DIMM 003 | 0 | 0 | 0 | DIMM 103 | 0 | 0 | 0 |
| DIMM 010 | 1 | 1 | 1 | DIMM 110 | 1 | 1 | 1 |
| DIMM 011 | 1 | 1 | 1 | DIMM 111 | 1 | 1 | 1 |
| DIMM 012 | 1 | 1 | 1 | DIMM 112 | 1 | 1 | 1 |
| DIMM 013 | 0 | 0 | 0 | DIMM 113 | 0 | 0 | 0 |

FIG. 16

| component | presence flag | normal flag | memory mirroring flag | component | presence flag | normal flag | memory mirroring flag |
|---|---|---|---|---|---|---|---|
| CPU0 | 1 | 1 | 1→0 | CPU1 | 1 | 0 | 0 |
| component | presence flag | normal flag | used flag | component | presence flag | normal flag | used flag |
| DIMM 000 | 1 | 1 | 1 | DIMM 100 | 1 | 0 | 0 |
| DIMM 001 | 1 | 1 | 1 | DIMM 101 | 1 | 0 | 0 |
| DIMM 002 | 1 | 1 | 1 | DIMM 102 | 1 | 0 | 0 |
| DIMM 003 | 0 | 0 | 0 | DIMM 103 | 0 | 0 | 0 |
| DIMM 010 | 1 | 1 | 1 | DIMM 110 | 1 | 0 | 0 |
| DIMM 011 | 1 | 1 | 1 | DIMM 111 | 1 | 0 | 0 |
| DIMM 012 | 1 | 1 | 1 | DIMM 112 | 1 | 0 | 0 |
| DIMM 013 | 0 | 0 | 0 | DIMM 113 | 0 | 0 | 0 |

FIG. 19

| Flag | Value |
|---|---|
| memory mirroring | 1 |
| memory-mirroring cancelling flag for CPU fallback | 1 |
| size adjusting flag when memory mirroring is cancelled | 1 |

FIG. 20

| component | presence flag | normal flag | memory mirroring flag | component | presence flag | normal flag | memory mirroring flag |
|---|---|---|---|---|---|---|---|
| CPU0 | 1 | 1 | 1 | CPU1 | 1 | 1 | 1 |
| CPU2 | 1 | 1 | 1 | CPU3 | 1 | 1 | 1 |

| component | presence flag | normal flag | used flag | component | presence flag | normal flag | used flag |
|---|---|---|---|---|---|---|---|
| DIMM 000 | 1 | 1 | 1 | DIMM 100 | 1 | 1 | 1 |
| DIMM 001 | 1 | 1 | 1 | DIMM 101 | 1 | 1 | 1 |
| DIMM 002 | 1 | 1 | 1 | DIMM 102 | 1 | 1 | 1 |
| DIMM 003 | 0 | 0 | 0 | DIMM 103 | 0 | 0 | 0 |
| DIMM 010 | 1 | 1 | 1 | DIMM 110 | 1 | 1 | 1 |
| DIMM 011 | 1 | 1 | 1 | DIMM 111 | 1 | 1 | 1 |
| DIMM 012 | 1 | 1 | 1 | DIMM 112 | 1 | 1 | 1 |
| DIMM 013 | 0 | 0 | 0 | DIMM 113 | 0 | 0 | 0 |
| DIMM 200 | 1 | 1 | 1 | DIMM 300 | 1 | 1 | 1 |
| DIMM 201 | 1 | 1 | 1 | DIMM 301 | 1 | 1 | 1 |
| DIMM 202 | 1 | 1 | 1 | DIMM 302 | 1 | 1 | 1 |
| DIMM 203 | 0 | 0 | 0 | DIMM 303 | 0 | 0 | 0 |
| DIMM 210 | 1 | 1 | 1 | DIMM 310 | 1 | 1 | 1 |
| DIMM 211 | 1 | 1 | 1 | DIMM 311 | 1 | 1 | 1 |
| DIMM 212 | 1 | 1 | 1 | DIMM 312 | 1 | 1 | 1 |
| DIMM 213 | 0 | 0 | 0 | DIMM 313 | 0 | 0 | 0 |

INFORMATION PROCESSING APPARATUS, METHOD OF INFORMATION PROCESSING, AND RECORDING MEDIUM HAVING STORED THEREIN PROGRAM FOR INFORMATION PROCESSING

CROSS-REFERENCE TO RELATED APPLICATION

This application is a continuation application of International Application PCT/JP2011/075967 filed on Nov. 10, 2011 and designated the U.S., the entire contents of which are incorporated herein by reference.

FIELD

The embodiment discussed herein is an information processing apparatus, a method of information processing, and a recording medium having stored therein a program for information processing.

BACKGROUND

The computer system that needs high reliability avoids system down by making Central Processing Units (CPUs), memories, and disks redundant. In the event of a failure in such a system, the system isolates the device having the failure and restarts to regain the operation (the isolation is called "fallback" or "degrading"). If a failure occurs in a CPU or a memory, the failed CPU or memory is degraded.

In particular, disks and memories, which frequently have failures, need to be redundant.

A memory capable of memory mirroring has been known as one method of making redundant. Such a memory can provide two times memory size when not being subjected to memory mirroring.

A method of reducing a memory size to be reduced in the event of a failure in a memory has been known.

In addition, a technique to incorporate a memory controller into a CPU has been recently proposed and such CPUs having therein memory controllers have been spread.

Advantageously, such a CPU can escape from lowering its performance due to bottleneck of a bus as compared with a conventional structure that connects a memory controller to the CPU via a common bus. Besides, such a system can provide a memory performance the same in extent as a scheme of connecting a memory with a CPU via an expensive cross bus switch that has conventionally applied to a main frame and UNIX (registered trademark) computer with a lower cost. For this reason, inexpensive PC servers have mainly adopted such a CPU.

A memory controller incorporated in such a CPU is equipped with a function of the above memory mirroring. Thus, the mirroring function of a memory controller incorporated in a CPU comes to be used in systems that needs high reliability.

Patent Literature 1: Japanese Laid-open Patent Publication No. SHO 57-074898
Patent Literature 2: Japanese Laid-open Patent Publication No. HEI 11-312120

In a multi-CPU system incorporating therein a memory controller, the memory connected to a CPU can read and write data only through the CPU. For the above, in the event of fallback of the CPU, the remaining CPUs come incapable of accessing the memories subordinate to the fallback CPU, so that the subordinate memories are also degraded.

Generally, an application such as a database expands part of data in memories and indexes the memories to speed up the processing. Therefore, when a predetermined memory amount is not ensured due to memory fallback, the throughput of the application largely lowers. If the worst happens, the startup of the application fails.

In a virtualization technique, which has recently been widespread, each virtualized guest operating system (OS) unit needs a predetermined amount of memory. Fallback of a memory reduces the number of operable guest OSs. For example, when a system having a three layers of Web, an application (AP), and a database (DB) is formed of multiple guest OSs, memory fallback disables the guest OSs from starting, so that the system does not operate. Likewise, memory fallback may disable a virtual PC that virtualizes clients from operating the needed number of PCs, which may interfere with the business operation.

For example, the above memory mirroring does not determine whether the memory is duplexed when a failure occurs in the CPU, and is therefore incapable of compensating for the memory reducing.

A typical computer system has a function of memory redundancy, CPU isolating, and automatic restart to improve the reliability of the system. However, simple isolation of the CPU, the memories subordinate to the isolated CPU are also isolated, so that an available memory size is reduced.

Simply canceling the memory mirroring in order to compensate for memory fallback when a failure occurs in a CPU may sometimes excessively increase available memories, which bloats the memory management table or the like. In some OSs and applications, the bloated setting remains after the system recovery, the available memory region is reduced, which may make it impossible to start the application. If the worst happens, the OS and the application need re-installation.

For example, although the method described above can reduce a memory size to be reduced when a failure occurs in a memory, the method unfortunately has no solution to increase in memory size due to cancellation of memory mirroring.

SUMMARY

To attain the above object, an information processing apparatus disclosed herein includes: a plurality of processors each having a plurality of memories and a memory controller that controls the plurality of memories; a normality checker that checks whether the plurality of processors operate normally when the information processing apparatus is started; a failure detector that finds any failed processor on the basis of a result of the checking by the normality checker; a fallback unit that falls back a failed processor if any; a redundancy determiner that determines whether the plurality of memories are used in a redundancy configuration that makes the plurality of memories redundant; a redundancy cancellation determiner that determines, when the redundancy determiner determines that the plurality of memories are used in the redundant configuration, whether the redundancy configuration of the plurality of memories is to be cancelled; and a redundancy canceller that cancels, when the redundancy cancellation determiner determines that the redundancy configuration of the plurality of memories is to be cancelled, the redundancy configuration of the plurality of memories in at least one processor operating normally among the plurality of processors.

A method of processing information in an information processing apparatus including a plurality of processors each having a plurality of memories and a memory controller that controls the plurality of memories, which method disclosed herein, includes: checking whether the plurality of processors operate normally when the information processing apparatus is started; finding any failed processor on the basis of a result of the checking; falling back a failed processor if any; determining whether the plurality of memories are used in a redundancy configuration that makes the plurality of memories redundant; determining that determines, when the plurality of memories are determined to be used in the redundant configuration, whether the redundancy configuration of the plurality of memories is to be cancelled; and cancelling, when the redundancy configuration of the plurality of memories is determined to be cancelled, the redundancy configuration of the plurality of memories in at least one processor operating normally among the plurality of processors.

A program for information processing disclosed herein causes an information processing apparatus including a plurality of processors each having a plurality of memories and a memory controller that controls the plurality of memories to function as: a normality checker that checks whether the plurality of processors operate normally when the information processing apparatus is started; a failure detector that finds any failed processor on the basis of a result of the checking by the normality checker; a fallback unit that falls back a failed processor if any; a redundancy determiner that determines whether the plurality of memories are used in a redundancy configuration that makes the plurality of memories redundant; a redundancy cancellation determiner that determines, when the redundancy determiner determines that the plurality of memories are used in the redundant configuration, whether the redundancy configuration of the plurality of memories is to be cancelled; and a redundancy canceller that cancels, when the redundancy cancellation determiner determines that the redundancy configuration of the plurality of memories is to be cancelled, the redundancy configuration of the plurality of memories in at least one processor operating normally among the plurality of processors.

A computer-readable recording medium having stored therein a program for information processing that causes an information processing apparatus including a plurality of processors each having a plurality of memories and a memory controller that controls the plurality of memories to function as: a normality checker that checks whether the plurality of processors operate normally when the information processing apparatus is started; a failure detector that finds any failed processor on the basis of a result of the checking by the normality checker; a fallback unit that falls back a failed processor if any; a redundancy determiner that determines whether the plurality of memories are used in a redundancy configuration that makes the plurality of memories redundant; a redundancy cancellation determiner that determines, when the redundancy determiner determines that the plurality of memories are used in the redundant configuration, whether the redundancy configuration of the plurality of memories is to be cancelled; and a redundancy canceller that cancels, when the redundancy cancellation determiner determines that the redundancy configuration of the plurality of memories is to be cancelled, the redundancy configuration of the plurality of memories in at least one processor operating normally among the plurality of processors.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating the structure of a memory mirroring specifying table of an example of the first embodiment;

FIG. 13 is a diagram illustrating an example of a memory mirroring specifying table under the state of FIG. 12;

FIG. 14 is a diagram illustrating an example of a CPU/memory configuration table under the state of FIG. 12;

FIG. 16 is a diagram illustrating an example of a CPU/memory configuration table under the state of FIG. 15;

FIG. 19 is a diagram illustrating an example of a memory mirroring specifying table under the state of FIG. 18;

FIG. 20 is a diagram illustrating an example of a CPU/memory configuration table under the state of FIG. 18;

DESCRIPTION OF EMBODIMENT(S)

Hereinafter, a first embodiment of the present invention will now be described with reference to the accompanying drawings.

A. System Configuration

Figure 1:
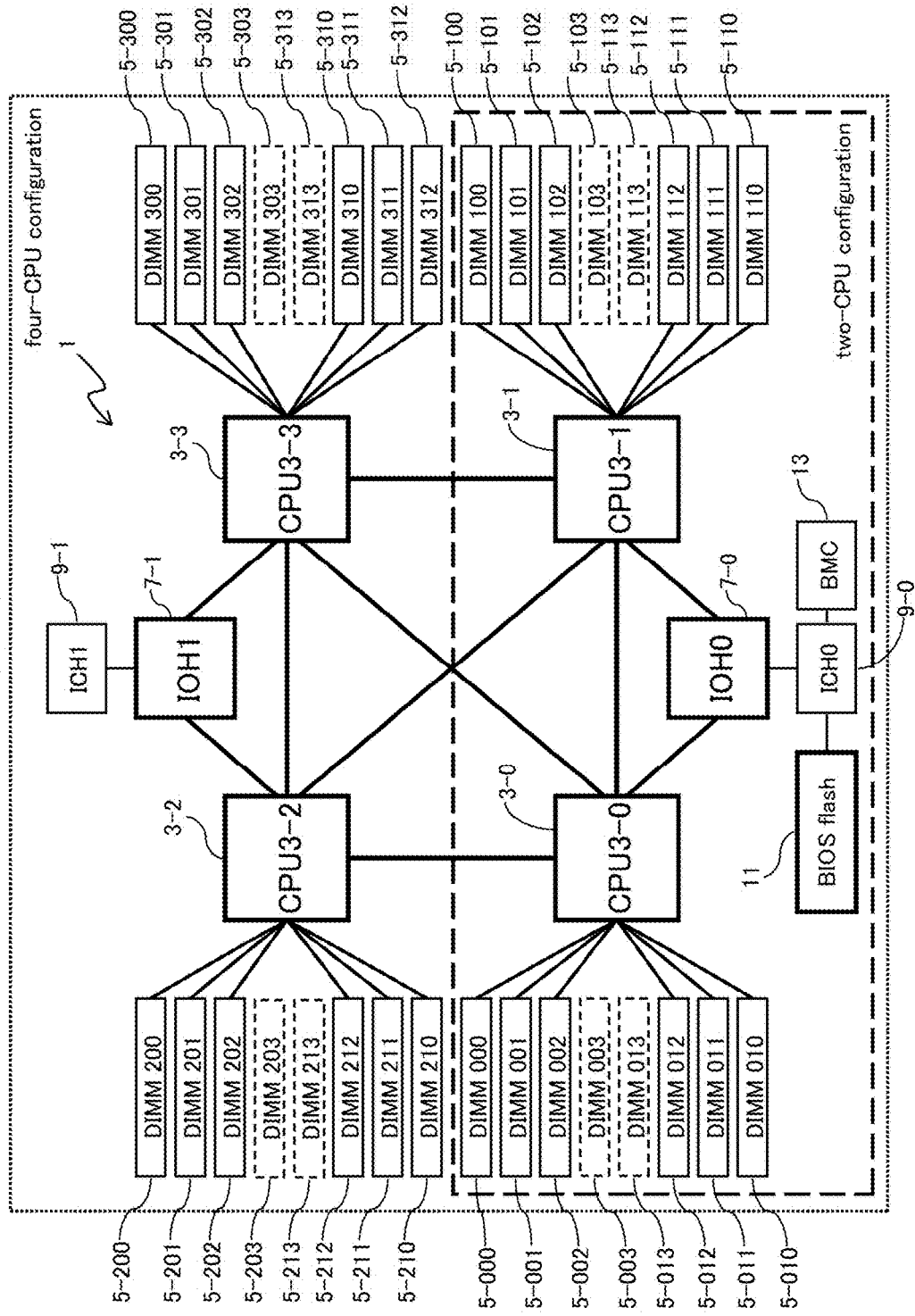
FIG. 1 is a schematic diagram illustrating the hardware configuration of a multiprocessor information processing system according to an example of a first embodiment.

FIG. 1 is a schematic diagram illustrating a hardware configuration of a multiprocessor information processing system (information processing apparatus) 1 according to an example of a first embodiment.

The multiprocessor information processing system 1 is a multiprocessor information processing system having multiple CUPs (processors) 3. The multiprocessor information processing system 1 has a redundancy function of memory duplexing (memory redundancy; mirroring) that duplexes memories to be used and is capable of, in the event of failure in a CPU 3, isolating the CPU 3 (fallback of the CPU 3).

The multiprocessor information processing system 1 can have various configurations. For example, a part enclosed by dotted lines in FIG. 1 has a four-CPU configuration and a part enclosed by broken lines in FIG. 1 has a two-CPU configuration. Namely, the multiprocessor information processing system 1 may have a two- or four-CPU configuration.

The multiprocessor information processing system 1 includes CPUs 3-0 to 3-3, Dual Inline Memory Modules (DIMMs) 5-000 to 5-312, Input/output hubs (IOHs) 7-0 and 7-1, and I/O controller Hubs (ICHs) 9-0 and 9-1. The multiprocessor information processing system 1 further includes a Basic Input/Output System (BIOS) flash 11, and a Baseboard Management Controller (BMC) 13. A single BIOS flash 11 and a single BMC 13 are provided irrespective of the number of CPUs.

When one of the multiple CPUs is specified, the specified CPU is represented by the reference number one from 3-0 to 3-3, but an arbitrary CPU is represented by the reference number 3.

When one of the multiple DIMMs is specified, the specified DIMM is represented by the reference number one from 5-000 to 5-312, but an arbitrary DIMM is represented by the reference number 5.

When one of the multiple IOH is specified, the specified IOH is represented by the reference number 7-0 or 7-1, but an arbitrary IOH is represented by the reference number 7.

Likewise, when one of the multiple ICH is specified, the specified ICH is represented by the reference number 9-0 or 9-1, but an arbitrary ICH is represented by the reference number 9.

A CPU 3 is a device that accomplishes various processes by executing one or more programs and that includes therein a memory controller 15 (see FIG. 3) that manages DIMMs 5 as to be detailed below. The memory controller 15 is compliant with mirroring of the DIMMs 5.

A DIMM 5 is a memory module having multiple DRAM chips mounted on a printed board. An access to a DIMM 5 or the like is controlled by the memory controller 15 that is included in the CPU 3 and that is to be described below.

Among multiple DIMMs 5, the DIMMs 5-003, 5-013, 5-103, 5-113, 5-203, 5-213, 5-303, and 5-313 depicted by broken lines represent slots which however do not mount DIMMs thereon.

An IOH 7 is a chip set that carries out data exchange between an ICH 9 that is to be detailed below and a CPU 3. The IOH 7 can be any known IOH.

An ICH 9 is a chip set that controls input and output, and can be any known ICH.

The BIOS flash 11 is a memory that stores therein a BIOS program and data that are read when the multiprocessor information processing system 1 is being started or restarted. The BIOS flash 11 stores therein a memory mirroring specifying table 17 and a CPU/memory configuration table 19 that are read by the BMC 13 when the multiprocessor information processing system 1 is being started and restarted. The memory mirroring specifying table 17 and the CPU/memory configuration table 19 will be detailed below.

The BMC 13 is a controller that manages the system board of the multiprocessor information processing system 1. Normally, the BMC 13 monitors hardware such as the CPUs 3 and the DIMMs 5, performs remote control, and records hardware events. The standard specification of the BMC 13 is defined in Intelligent Platform Management Interface (IPMI).

The multiprocessor information processing system 1 can set a redundant configuration by combining multiple memories, and can set, for example, memory mirroring. When memory mirroring is to be set, memory mirroring is accomplished by paring two DIMMs 5 connected to the same CPU 3. For example, the DIMM 5-000 and the DIMM 5-010 are duplexed; the DIMM 5-001 and the DIMM 5-011 are duplexed; and the DIMM 5-002 and the DIMM 5-012 are duplexed, so that each DIMM pair functions as a single DIMM. The DIMM 5-100 and the DIMM 5-110 are duplexed; the DIMM 5-101 and the DIMM 5-111 are duplexed; and the DIMM 5-102 and the DIMM 5-112 are duplexed, so that each DIMM pair functions as a single DIMM. The DIMM 5-200 and the DIMM 5-210 are duplexed; the DIMM 5-201 and the DIMM 5-211 are duplexed; and the DIMM 5-202 and the DIMM 5-212 are duplexed, so that each DIMM pair functions as a single DIMM. The DIMM 5-300 and the DIMM 5-310 are duplexed; the DIMM 5-301 and the DIMM 5-311 are duplexed; and the DIMM 5-302 and the DIMM 5-312 are duplexed, so that each DIMM pair functions as a single DIMM.

In the multiprocessor information processing system 1, which has such a mirroring function, the memory mirroring specifying table 17 and the CPU/memory configuration table 19 are read when the multiprocessor information processing system 1 is being started or restarted. If the memory mirroring specifying table 17 and the CPU/memory configuration table 19 are changed, the changed tables 17 and 19 are stored into the BIOS flash 11 after the execution of POST. At the same time, copies of the memory mirroring specifying table 17 and the CPU/memory configuration table 19 are stored into the memory controllers 15 of the respective CPUs 3.

The memory controller 15 of each CPU 3 carries out memory access in response to the requests from the processing core 21 and the cache memory 23 (see FIG. 3) in the CPU 3 that are to be detailed below, another CPU 3, and the IOH 7.

When memory mirroring is not set, a DIMM 5 for which a presence flag 43, a normal flag 45, and a used flag 49 in the CPU/memory configuration table 19 to be detailed below are set to be, for example, "1" is used for reading or writing. For example, data reading or data writing is performed on the DIMM 5-000, the DIMM 5-001 . . . , the DIMM 5-010, the DIMM 5-011 . . . in this order.

When memory mirroring is set, writing is performed on the DIMM 5-000 and the DIMM 5-001 . . . and also on the DIMM 5-010, the DIMM 5-011 . . . . This means that each pair of duplexed DIMMs concurrently undergoes writing. Likewise, each pair of duplexed DIMMs concurrently undergoes reading. An ECC check code is attached to data to be written into DIMMs 5 and, among data read from each of duplexed DIMMs 5, data that is determined to be normal as a result of an ECC check is to be used.

Figure 2:
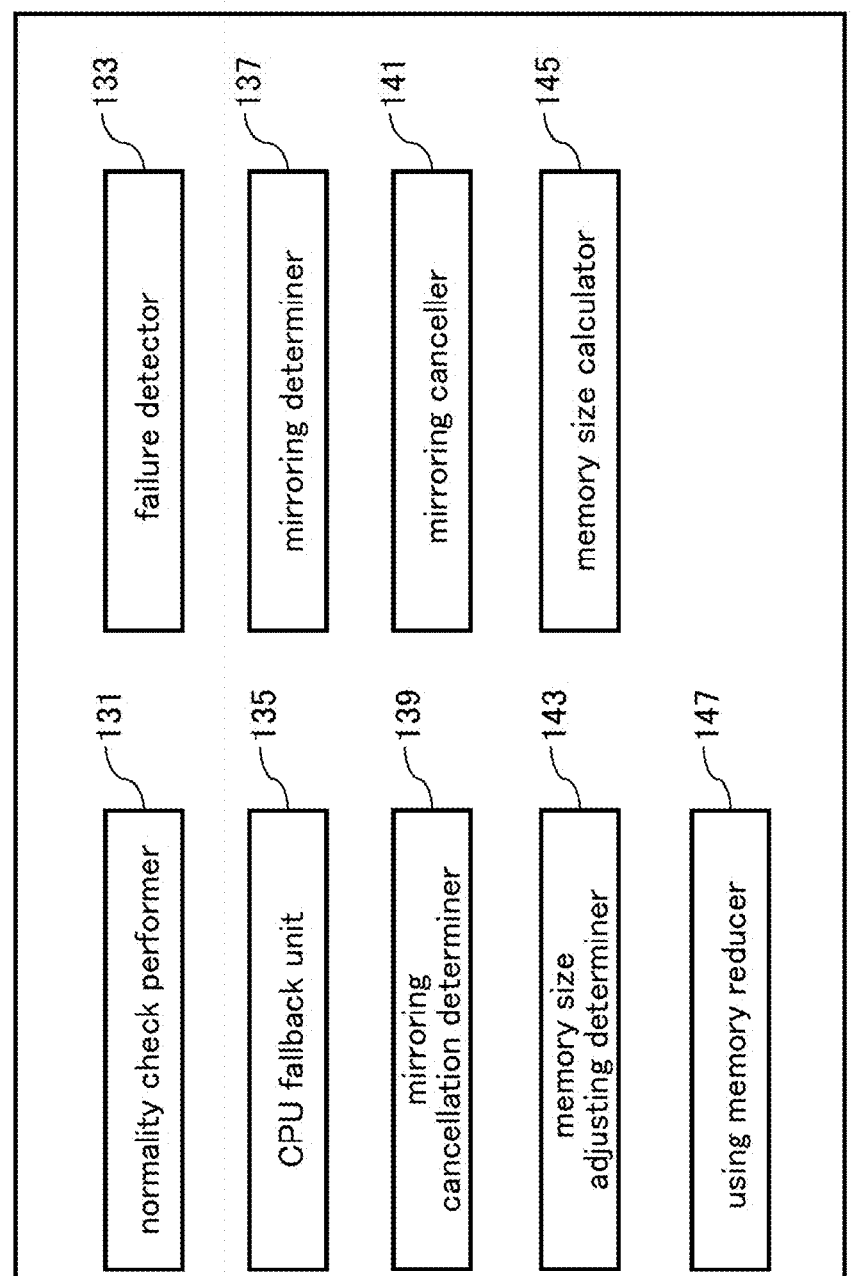
FIG. 2 is a schematic diagram illustrating the functional configuration of a multiprocessor information processing system according to an example of a first embodiment.

FIG. 2 is a schematic diagram illustrating a functional configuration of the multiprocessor information processing system 1 as an example of the first embodiment.

The multiprocessor information processing system 1 includes a normality check performer (normality checker) 131, a failure detector (failure detector) 133, a CPU fallback unit (fallback unit) 135, a mirroring determiner (redundancy determiner) 137, a mirroring cancellation determiner (redundancy cancellation determiner) 139, a mirroring canceller (redundancy canceller) 141, a memory size adjusting determiner (size adjusting determiner) 143, a memory size calculator (size calculator) 145, and a using memory reducer (adjustor) 147.

The normality check performer 131 causes each CPU 3 and each DIMM 5 to perform power on self test (POST) on the CPU 3 and the DIMM 5, respectively, and receives the result of execution of POST from the CPU 3 and the DIMM 5.

The failure detector 133 determines on the basis of the result obtained by the normality check performer 131 whether each CPU 3 and each DIMM 5 operate normally. Namely, if being notified of normal completion of POST from the CPU 3 and the DIMM 5, the failure detector 133 determines that the CPU 3 and the DIMM 5 operate normally. If the CPU 3 and the DIMM 5 do not respond or notify of abnormal completion of POST, the failure detector 133 determines that the CPU 3 and the DIMM 5 have failures.

The CPU fallback unit 135 isolates (falls back) a CPU 3 that the failure detector 133 detects to have a failure. Furthermore, the CPU fallback unit 135 isolates a DIMM 5 that is detected to have a failure and also falls back the DIMMs 5 subordinate to the fallback CPU 3. The fallback is carried out in any known manner of, for example, interrupting power supply to the CPU 3 or the DIMM 5, or disconnecting the bus to the CPU 3 or the DIMM 5.

The mirroring determiner 137 determines whether the DIMMs 5 are duplexed (mirrored). For example, when the value "1" is set in the memory mirroring flag 31 of the memory mirroring specifying table 17 to be detailed below, the mirroring determiner 137 determines that the DIMMs 5 are duplexed.

The mirroring cancellation determiner 139 determines, when the DIMMs 5 are duplexed, whether the mirroring of the DIMMs 5 are to be cancelled. For example, when the value "1" is set in the memory-mirroring cancelling flag 33 for CPU fallback of the memory mirroring specifying table 17 to be detailed below, the mirroring cancellation determiner 139 determines that the DIMMs 5 are duplexed.

The mirroring canceller 141 cancels duplexing of the DIMMs 5. For example, the mirroring canceller 141 cancels memory mirroring by setting the value "0" in the memory mirroring flag 31 of the memory mirroring specifying table 17 to be detailed below and also setting the value "0" in the memory mirroring flag 47 of the CPU/memory configuration table 19.

The memory size adjusting determiner 143 determines, when duplexing of the DIMMs 5 is cancelled due to the fallback of the failed CPU 3, whether the memory size is to be adjusted such that the available memory size after the fallback approaches the available memory size before the fallback (adjustment on the memory size). When the value "1" is set in the memory-mirroring cancelling flag 33 for CPU fallback of the memory mirroring specifying table 17, the memory size adjusting determiner 143 determines that the adjustment on the memory size is to be carried out.

The memory size calculator 145 calculates the available memory size (actual memory size) under a state where the DIMMs are duplexed before fallback of the CPU 3, and a memory size after fallback of the CPU 3 and cancellation of duplexing of the DIMMs 5. Specifically, the memory size calculator 145 calculates the total size (Ma) of the DIMMs 5 each having the value "1" in the presence flag 43 in the CPU/memory configuration table 19 to be detailed below and the total size (Mn) of the DIMMs 5 each having the value "1" of the normal flag 45 in the CPU/memory configuration table 19.

The using memory reducer 147 falls back part of the DIMMs 5 such that the available memory size after the fallback of the CPU 3 and the cancellation of the duplexing of the DIMMs 5 approximates to the available memory size under the state where the DIMMs 5 are duplexed before fallback of the CPU 3. The using memory reducer 147 adjusts the memory size by setting the value of the used flags 49 of the normal DIMMs 5 connected to normal CPU 3 to "0" one by one until the memory sizes Ma and Mn calculated by the memory size calculator 145 satisfies the relationship of M1/2≥Mn.

The memory size Ma is divided by two because the available actual memory size when memory mirroring corresponds to one-half of the total memory size being mounted.

Figure 3:
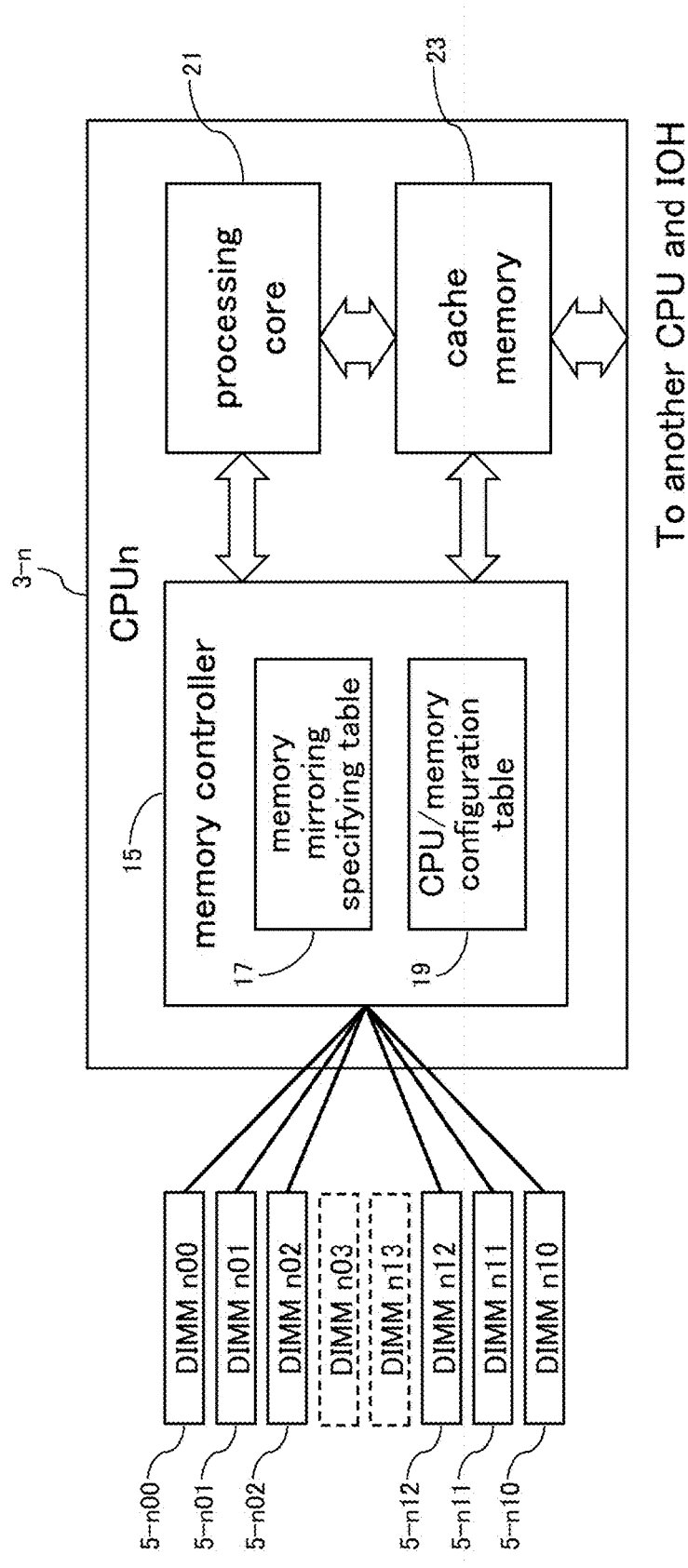
FIG. 3 is a schematic diagram illustrating the hardware configuration of a CPU according to an example of the first embodiment.

FIG. 3 is a schematic diagram illustrating the hardware configuration of the CPU 3 of an example of the first embodiment.

The CPU 3 includes the memory controller 15, the processing core 21, and the cache memory 23.

The memory controller 15 is a controller that controls, for example, access to a DIMM 5 and duplexing of the DIMMs 5.

The processing core 21 is a circuit that executes various processes of the CPU 3. Only one processing core 21 appears in FIG. 3, but alternatively, multiple processing cores 21 may be included.

The cache memory 23 is a storing region that temporarily stores therein data sent and received between the processing core 21 and the DIMMs 5, and is exemplified by an L1 cache and an L2 cache.

The memory controller 15 has the memory mirroring specifying table 17 and the CPU/memory configuration table 19 for managing the configuration and duplexing of the DIMMs 5. The memory mirroring specifying table 17 and the CPU/memory configuration table 19 are stored in the BIOS flash 11, and reads from the BIOS flash 11 when the system 1 is started/restarted and the copies of the tables 17 and 19 are stored in the memory controller 15 of the respective CPU 3.

FIG. 4 is a diagram illustrating the configuration of the memory mirroring specifying table 17 of an example of the first embodiment.

The memory mirroring specifying table 17 is a table that stores therein the setting related to memory mirroring. The memory mirroring specifying table 17 includes the memory mirroring flag 31, a memory-mirroring cancelling flag 33 for CPU fallback (redundancy cancelling information), and a size adjusting flag 35 when memory mirroring is cancelled (size adjusting information).

The memory mirroring flag 31 is a flag that specifies whether the memories subordinate to each CPU 3 is to be duplexed. For example, when the value "1" is set in the memory mirroring flag 31, the DIMMs 5 subordinate to the corresponding CPU 3 are to be duplexed. When the value "0" is set in the flag 31, the corresponding DIMMs 5 are not duplexed. The flag 31 is used by the mirroring determiner 137 to determine whether the memories are duplexed or not duplexed.

The memory-mirroring cancelling flag 33 for CPU fallback is a flag that specifies whether the mirroring canceller 141 is to cancel memory mirroring when fallback of the CPU 3 under the state where the memory mirroring is set. For example, when the value "1" is set in the memory-mirroring cancelling flag 33 for CPU fallback, the mirroring canceller 141 cancels the memory duplexing when fallback of the CPU 3. When the value "0" is set in the flag 33, the mirroring canceller 141 does not cancel the memory mirroring.

The size adjusting flag 35 when memory mirroring is cancelled is a flag that specifies whether each DIMM 5 is to undergo adjustment on the memory size thereof by the using memory reducer 147 when the memory mirroring is to be cancelled. When the value "1" is set in the size adjusting flag 35 when memory mirroring is cancelled, the using memory reducer 147 adjusts the memory size by fallback of part of the DIMMs 5. When the value "0" is set in the size adjusting flag 35 when memory mirroring is cancelled, the using memory reducer 147 does not adjust the memory size.

The values of the memory mirroring flag 31, the memory-mirroring cancelling flag 33 for CPU fallback, and the size adjusting flag 35 when memory mirroring is cancelled may be initially set when the apparatus is shipped from the manufacturing factory and then changed by the user, or may be automatically set by the system 1.

Figure 5:
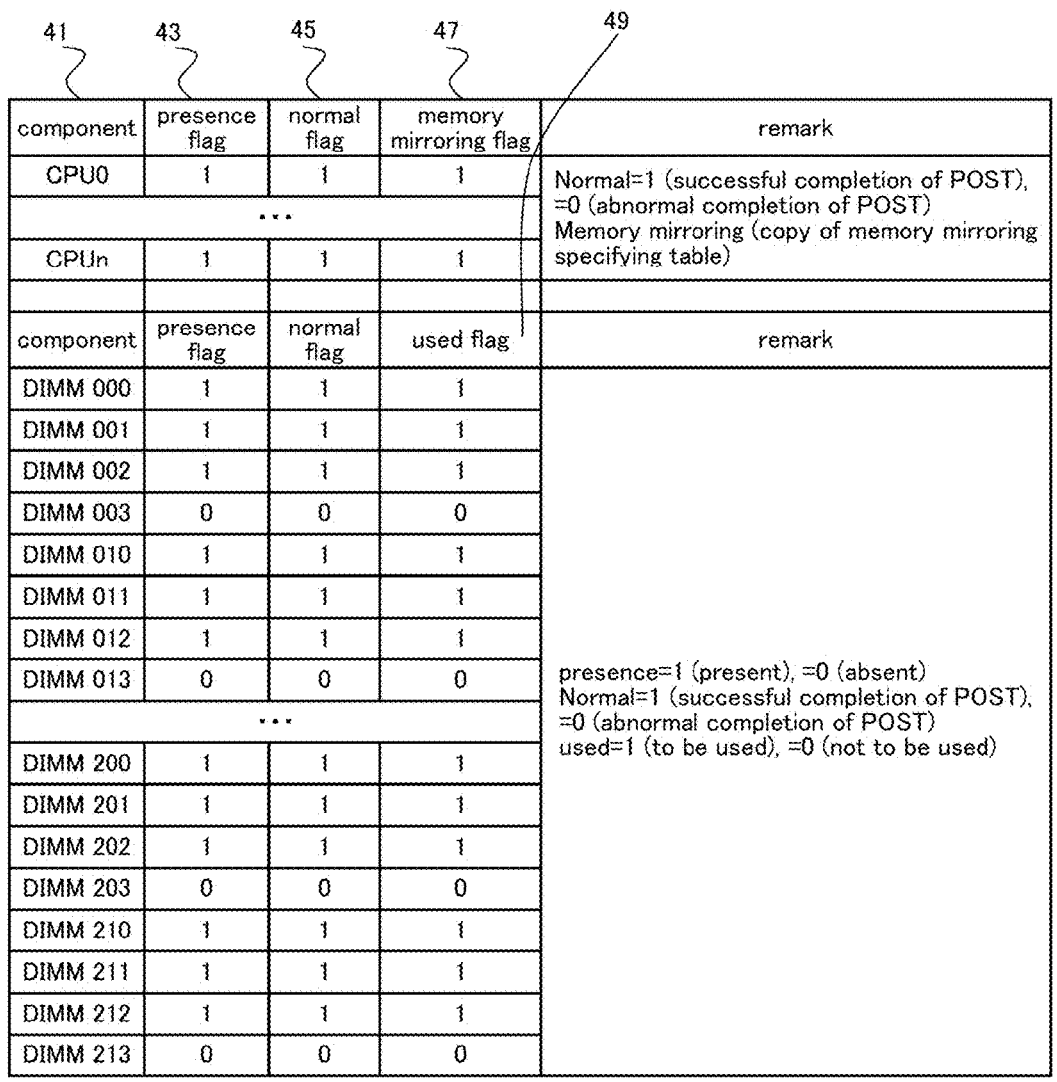
FIG. 5 is a diagram illustrating the structure of a CPU/memory configuration table of an example of the first embodiment.

FIG. 5 is a diagram illustrating the structure of the CPU/memory configuration table 19 of an example of the first embodiment.

The CPU/memory configuration table 19 is a table that stores therein the hardware configuration of the CPUs 3 and the DIMMs 5. The CPU/memory configuration table 19 includes a component field 41, a presence flag 43, a normal flag 45, a memory mirroring flag 47, and a used flag 49.

The component field 41 is an identifier of the slot of a CPU 3 or a DIMM 5, and stores therein an alphanumeric identifier indicating the slot of the CPU 3 or the DIMM 5.

The presence flag 43 is a flag that indicates whether a component (a CPU 3 or a DIMM 5) is mounted on the slot of a CPU 3 or a DIMM 5 specified in the component field 41. For example, when the value "1" is set in the presence flag 43, a component (a CPU 3 or a DIMM 5) is mounted on the corresponding slot. When the value "0" is set in the presence flag 43, a component (a CPU 3 or a DIMM 5) is not mounted on the corresponding slot.

The normal flag 45 indicates whether the POST on the component (a CPU 3 or a DIMM 5) being mounted on the corresponding slot is successfully completed. For example, when the value "1" is set in the normal flag 45, the POST of the corresponding component is successfully completed. When the value "0" is set in the flag 45, the POST of the component is abnormally completed, which means that the component fails when the multiprocessor information processing system 1 is started. The POST is executed by the BMC 13 described above when the multiprocessor information processing system 1 is started.

The memory mirroring flag 47 is a flag used when the component is a CPU 3, and indicates whether the DIMMs subordinate to the CPU 3 is to be duplexed. The value of the memory mirroring flag 31 in the above memory mirroring specifying table 17 is copied into the flag 47. As described above, when the value "1" is set in the memory mirroring flag 47, the DIMMs subordinate to the CPU 3 are to be duplexed. As described above, when the value "0" is set in the memory mirroring flag 47, the DIMMs subordinate to the CPU 3 are not to be duplexed.

The used flag 49 is a flag used when the component is a DIMM 5, and indicates whether the DIMM 5 is to be used. When the mirroring canceller 141 cancels duplexing of the DIMMs 5 when the CPU 3 detected to have a failure is degraded, the available memory size sometimes increases as compared to the available memory size before the fallback of the CPU 3. To avoid this inconvenience, the using memory reducer 147 falls back part of the DIMMs 5 such that he available memory size after the fallback of the CPU 3 approximates to that before the fallback as close as possible. For this purpose, the using memory reducer 147 sets, for example, the value "0" in the used flag 49 of a DIMM 5 to be degraded. The using memory reducer 147 does not change the value of the used flag 49 of a DIMM 5 that is to be used and the value in the flag 49 keeps the set value "1".

FIG. 5 is an example of the table in which the values are set in the respective flags.

The values of the component field 41, the presence flag 43, the normal flag 45, the memory mirroring flag 47, and the used flag 49 may be initially set when the apparatus is shipped from the manufacturing factory and then changed by the user, or may be automatically set by the system 1.

B. System Operation

Hereinafter, description will now be made in relation to operation performed in the multiprocessor information processing system 1 with reference to the accompanying drawings.

Figure 6:
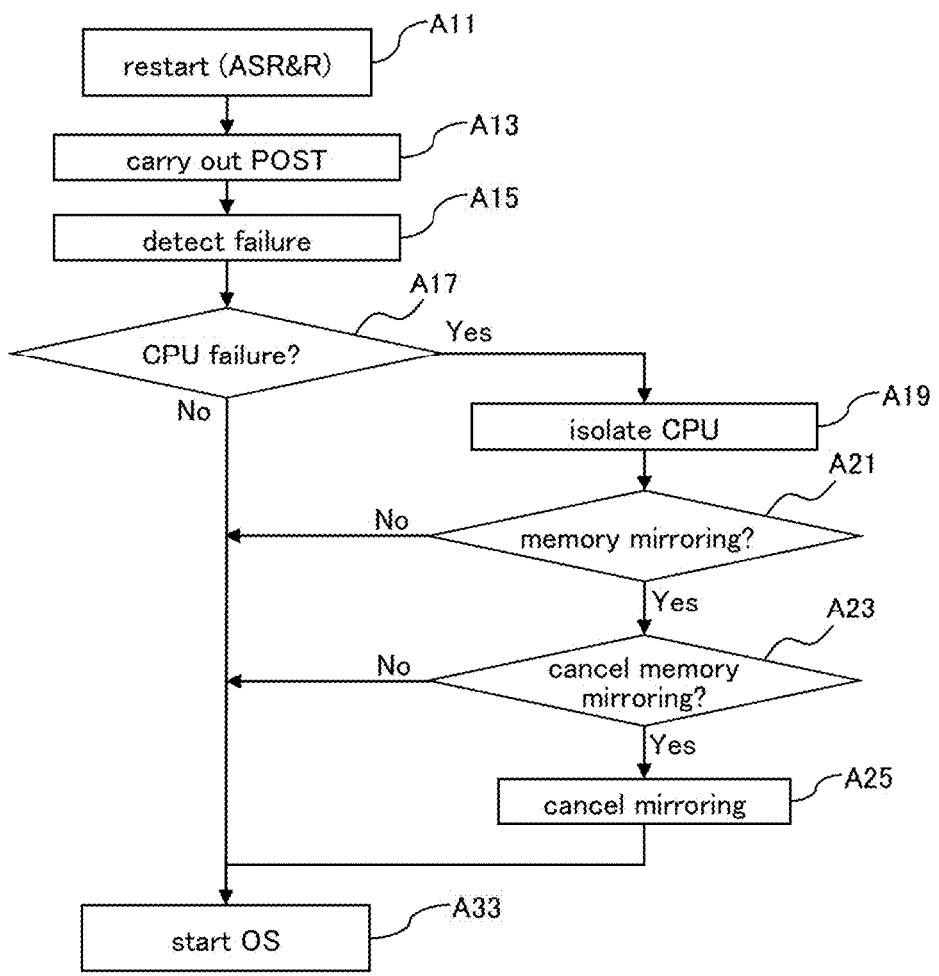
FIG. 6 is a flowchart illustrating the overview of restarting operation performed when the memory size is not to be adjusted in an example of the first embodiment.

FIG. 6 is a flowchart illustrating the overview of restarting operation performed when the memory size is not to be adjusted in an example of the first embodiment.

In step A11, the multiprocessor information processing system 1 is restarted. In this drawing, the multiprocessor information processing system 1 is restarted by, for example, the function of Automatic Server Reset and Restart (ASR&R).

In step A13, the normality check performer 131 carries out the POST on the multiprocessor information processing system 1.

In step A15, the failure detector 133 checks whether any failure occurs in all the CPUs 3 included in the multiprocessor information processing system 1 (normality check).

In step A17, the failure detector 133 determines whether a CPU 3 having a failure is present.

When all the CPUs 3 is normal (see No route in step A17), the procedure moves to step A33 that will be detailed below. When at least one CPU 3 has a failure (see Yes route in step A17), the CPU fallback unit 135 degrades (falls back) the failed CPU 3 in step A19 and thereby isolates the CPU 3 from the multiprocessor information processing system 1. Consequently, this isolates (degrades) the DIMMs 5 subordinate to the fallback CPU 3.

In the next step A21, the mirroring determiner 137 determines whether memory mirroring of the DIMMs 5 is set. This determination is made by the mirroring determiner 137 reading the value set in the memory mirroring flag 31 of the memory mirroring specifying table 17. Namely, if the value "1" is set in the memory mirroring flag 31 in the memory mirroring specifying table 17, the mirroring determiner 137 determines that memory mirroring is set.

In step A21, memory mirroring of the DIMMs 5 is determined not to be set (see No route in step A21), the procedure moves to step A33 to be detailed below. In contrast, memory mirroring of the DIMMs 5 is determined to be set (Yes route in step A21), the mirroring cancellation determiner 139 determines in step A23 whether the memory mirroring is set to be cancelled when fallback of the corresponding CPU 3. This determination is made by reading the value set in the memory-mirroring cancelling flag 33 for CPU fallback of the memory mirroring specifying table 17. Namely, when the value "1" is set in the memory-mirroring cancelling flag 33 for CPU fallback of the memory mirroring specifying table 17, the mirroring cancellation determiner 139 determines that memory mirroring is set.

When it is determined in step A23 that cancelling of the memory mirroring when the fallback of is not set (see No route in step A23), the procedure moves to step A33 that is to be detailed below. In contrast, when it is determined in step A23 that cancelling of the memory mirroring when fallback of the CPU is set (see Yes route in step A23), the mirroring canceller 141 cancels the memory mirroring in step A25.

In the final step A33, the BMC 13 starts the OS.

Next, description will now be made in relation to a method of information processing in the multiprocessor information processing system 1 illustrated in FIG. 1 when the memory size is not to be adjusted (sic, correctly "when the memory size is to be adjusted").

Figure 7:
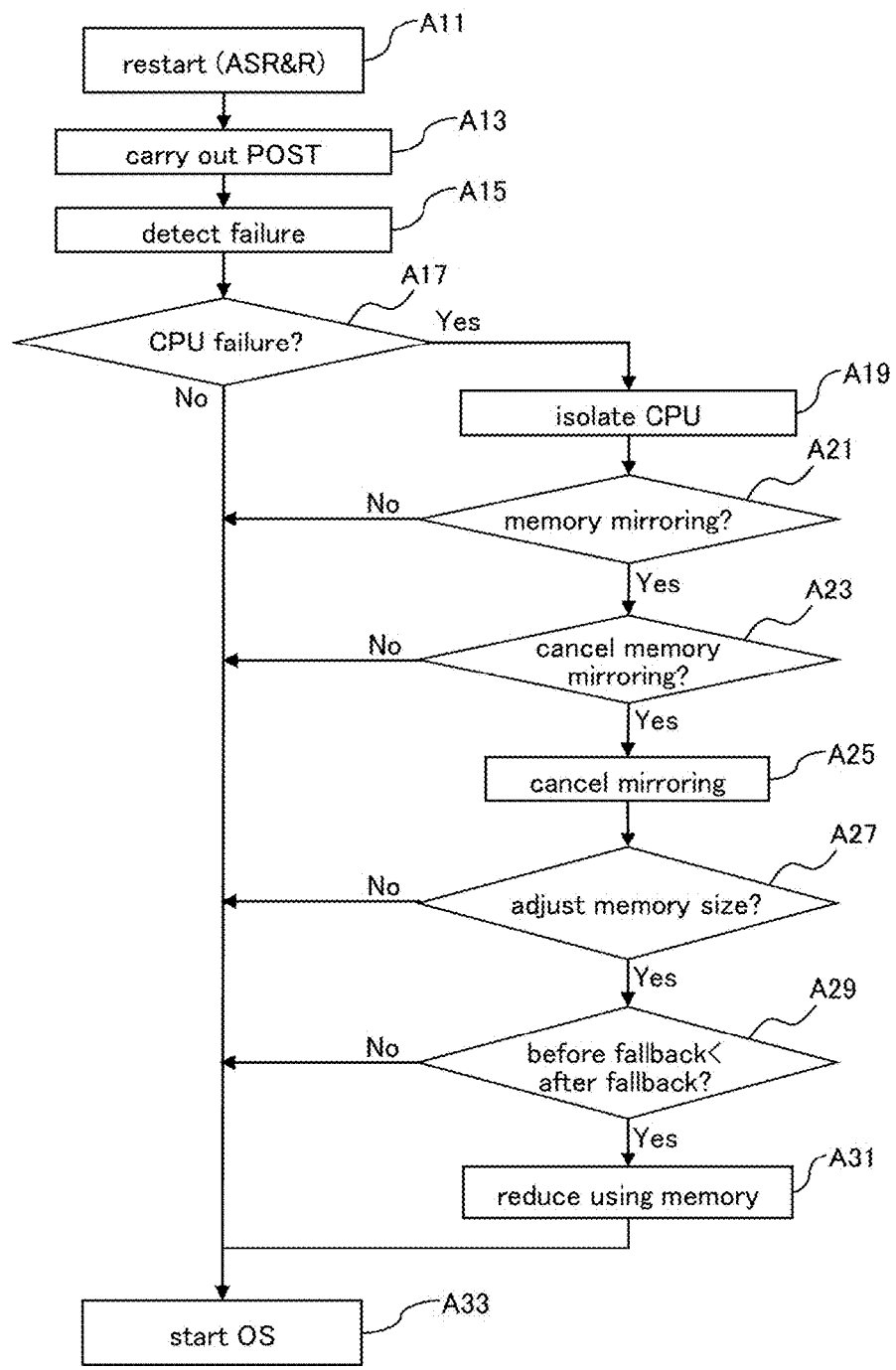
FIG. 7 is a flowchart illustrating the overview of restarting operation performed when the memory size is to be adjusted in an example of the first embodiment.

FIG. 7 is a flowchart illustrating the overview of restarting operation performed when the memory size is to be adjusted in the first embodiment.

In step A11, the multiprocessor information processing system 1 is restarted. In this drawing, the multiprocessor information processing system 1 is restarted by, for example, the function of Automatic Server Reset and Restart (ASR&R).

In step A13, the normality check performer 131 carries out the POST on the multiprocessor information processing system 1.

In step A15, the failure detector 133 checks whether any failure occurs in all the CPUs 3 included in the multiprocessor information processing system 1 (normality check).

In step A17, the failure detector 133 determines whether a CPU 3 having a failure is present.

When all the CPUs 3 is normal (see No route in step A17), the procedure moves to step A33 that will be detailed below. When at least one CPU 3 has a failure (see Yes route in step A17), the CPU fallback unit 135 falls back failed CPU 3 in step A19 and thereby isolates the CPU 3 from the multiprocessor information processing system 1. Consequently, this isolates (degrades, falls back) the DIMMs 5 subordinate to the fallback CPU 3.

In the next step A21, the mirroring determiner 137 determines whether memory mirroring of the DIMMs 5 is set. This determination is made by the mirroring determiner 137 reading the value set in the memory mirroring flag 31 of the memory mirroring specifying table 17. Namely, if the value "1" is set in the memory mirroring flag 31 in the memory mirroring specifying table 17, the mirroring determiner 137 determines that memory mirroring is set.

In step A21, memory mirroring of the DIMMs 5 is determined not to be set (see No route in step A21), the procedure moves to step A33 to be detailed below. In contrast, memory mirroring of the DIMMs 5 is determined to be set (see Yes route in step A21), the mirroring cancellation determiner 139 determines in step A23 whether the memory mirroring is set to be cancelled when fallback of the corresponding CPU 3. This determination is made by reading the value set in the memory-mirroring cancelling flag 33 for CPU fallback of the memory mirroring specifying table 17. Namely, when the value "1" is set in the memory-mirroring cancelling flag 33 for CPU fallback of the memory mirroring specifying table 17, the mirroring cancellation determiner 139 determines that memory mirroring is set.

When it is determined in step A23 that cancelling of the memory mirroring when fallback of the CPU is not set (see No route in step A23), the procedure moves to step A33 that is to be detailed below. In contrast, when it is determined in step A23 that cancelling of the memory mirroring when fallback of the CPU is set (see Yes route in step A23), the mirroring canceller 141 cancels the memory mirroring in step A25.

In the next step A27, the memory size adjusting determiner 143 determines whether the memory size is to be adjusted. This determination is made by reading the value of the size adjusting flag 35 when memory mirroring is cancelled in the memory mirroring specifying table 17 described above. Namely, if the value "1" is set in the size adjusting flag 35 when memory mirroring is cancelled of the above memory mirroring specifying table 17, the mirroring cancellation determiner 139 determines that the memory mirroring is set.

When it is determined that the memory size is not to be adjusted in step A27 (see No route in step A27), the procedure moves to step A33 that is to be detailed below. When it is determined that the memory size is to be adjusted in step A27 (see Yes route in step A27), the memory size calculator 145 calculates an actual memory size of the duplexed memories before the fallback and a memory size of the memories the duplexing of which is cancelled after the fallback, and compares the calculated memory sizes with each other.

When the memory size of the memories the multiplexing thereof is cancelled after the fallback is not more than the actual memory size of the duplexed memories before the fallback (see No route in step A29), the procedure moves to step A33 that is to be detailed below.

In contrast, when the memory size of the memories the multiplexing thereof is cancelled after the fallback is more than the actual memory size of the duplexed memories before the fallback (see YEs route in step A29), the using memory reducer 147 falls back part of the DIMMs 5 in step A31 such that the memory size of the memories the multiplexing thereof is cancelled after the fallback comes to be the same as the actual memory size of the duplexed memories before the fallback. At that time, the using memory reducer 147 sets, for example, the value "0" in the used flag 49 of each DIMM 5 that is to be disabled.

In the last step A33, the BMC 13 starts the OS.

Hereinafter, the processes of FIGS. 6 and 7 will now be detailed with reference to FIGS. 8-11.

Figure 8:
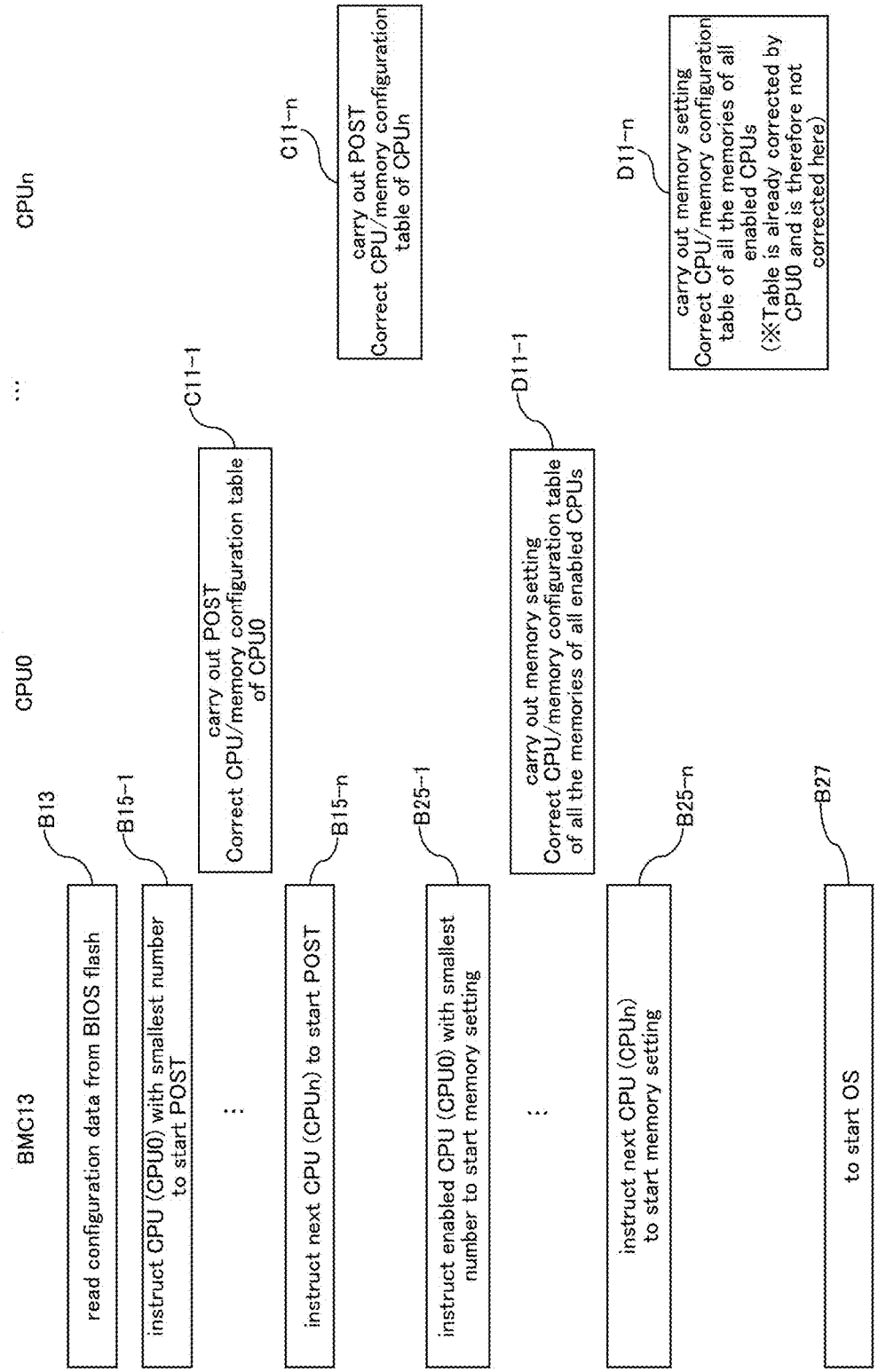
FIG. 8 is a time chart illustrating operations performed by a BMC and respective CPUs when a multiprocessor information processing system is restarted (or started) in an example of the first embodiment.

FIG. 8 is a time chart illustrating operations performed by the BMC 13 and the respective CPUs 3 when the multiprocessor information processing system 1 of an example of the first embodiment is restarted (or started).

In FIG. 8, the left-end column represents processes performed by the BMC 13; the right column of the BMC column represents processes performed by the CPU0 (in this example, the CPU 3-0); and the right-end column represents a process performed by the CPUn (n is an integer of one or more, n=1 in a two-CPU system, and n=3 in a four-CPU system).

When the multiprocessor information processing system 1 is powered on, the BMC 13 reads the configuration data stored in the BIOS flash 11 in step B13. The configuration information includes information about the CPUs 3 and the DIMMs 5 and information about the hardware including the I/O.

In step B15-1, the BMC 13 instructs the CPU 3 having the smallest number (i.e., the CPU 3-0 in this example) among the CPUs being mounted to carry out POST.

In response to the instruction, the CPU 3-0 tests the functions of the respective blocks (e.g., the processing core 5 and the processing core 21 of FIG. 2) in the CPU 3-1 itself and thereby confirms whether the CPU 3-0 is normal in step C11-1.

The BMC 13 sequentially instructs the next CPU being mounted to carry out POST, and consequently instructs all the CPUs (CPU0 to CPUn) to carry out POST (step B15-n).

When the POST on the CPU0 (e.g., the CPU 3-0) detects any failure, the CPU0 reports the BMC 13 that it fails. When receiving a response reporting the failure or no response, the failure detector 133 determines that the CPU0 fails. The failure detector 133 changes the value of the normal flag of the CPU0 in the CPU/memory configuration table 19 to "0" and also changes the values of the normal flags of the DIMMs 5 belonging to the CPU0 to "0".

When the CUP0 is normal, the CPU0 carries out various test each subordinate DIMM 5 of the CPU0 through comparison of written data and read data and checking the presence or the absence of error data such as ECC. If a failure is detected in any of the corresponding DIMMs 5, the normal flag of the corresponding DIMM 5 is corrected to "0". Here, since whether or not the remaining CPUs 3 operate normally has not been confirmed yet, the test is carried out only on the corresponding DIMMs 5 connected to the CPU0 to be tested.

The next CPU, which successfully completes POST, subsequently carries out POST on the subordinates DIMMs 5 thereof. In the same manner, all the CPUs (CPU0 to CPUn) carry out POST on the respective corresponding DIMMs 5 (step C11-n).

When POST of all the CPUs is completed, the BMC 13 instructs in step B25-1 the enabled CPU0 with the smallest number to start memory setting by referring to the CPU/memory configuration table 19 again.

In response to this instruction, the CPU0 reads the memory mirroring specifying table and the CPU/memory configuration table 19 of all the CPUs again and starts memory setting.

When the value "0" is set in the memory mirroring flag 31 or in the memory-mirroring cancelling flag 33 for CPU fallback, the memory size is not to be adjusted and the CPU/memory configuration table 19 is copied into the memory controller 15 in the CPU to finish the procedure. In contrast, if the value "1" is set in the memory mirroring flag 31, the memory mirroring is also set.

When the value "1" is set both in the memory mirroring flag 31 and the memory-mirroring cancelling flag 33 for CPU fallback, the memory size calculator 145 calculates the total size (Ma) of the DIMMs 5 each having the value "1" of the presence flag 43 in the CPU/memory configuration table 19 and the total size (Mn) of the DIMMs 5 each having the value "1" of the normal flag 45, and compares the total sizes with each other. When the relationship Ma/2=Mn is satisfied, the BMC 13 corrects the value of the memory mirroring flag 31 to "0". The BMC 13 copies the memory mirroring specifying table 17 and the CPU/memory configuration table 19 into the memory controller 15 in the CPU and writes the tables 17 and 19 into the BIOS flash 11.

When the relationship Ma/2<Mn is satisfied, the using memory reducer 147 sets the values of used flags 49 of normal DIMMs 5 connected to a normal CPU one by one to change the contents in the CPU/memory configuration table 19 such that the used DIMMs 5 are reduced until the relationship Ma/2≥Mn.

Then, the BMC 13 sequentially instructs the next CPU to start memory setting and consequently instructs all the CPUs (CPU0 to CPUn) to start memory setting (step B25-n).

However, setting of the memories of all the CPUs and correction of the CPU/memory configuration table 19 have already made by the CPU0, and therefore CPU/memory configuration table 19 is not actually corrected here.

In the last step B27, the BMC 13 instructs starting of OS.

Next, the operation of the respective elements of the multiprocessor information processing system 1 will now be detailed with reference to the flowcharts.

Figure 9:
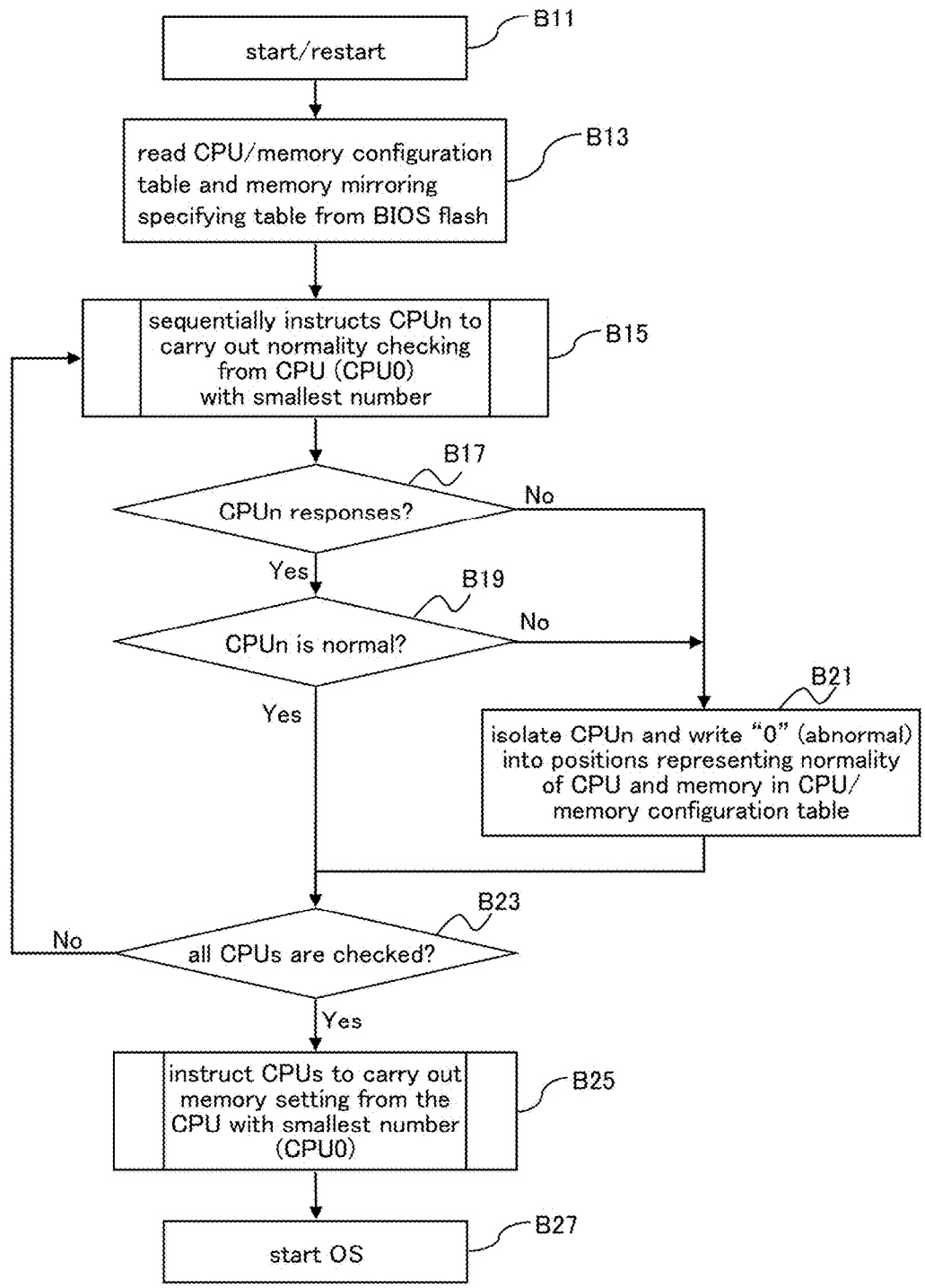
FIG. 9 is a flowchart illustrating an operation of a BMC of a multiprocessor information processing system of an example of the first embodiment.

FIG. 9 is a flowchart illustrating an operation of the BMC 13 of the multiprocessor information processing system 1 of an example of the first embodiment.

First of all, in step B11, the multiprocessor information processing system 1 is started and restarted.

In the next step B13 (corresponding to step B13 in FIG. 8 described above), the BMC 13 reads the memory mirroring specifying table 17 and the CPU/memory configuration table 19 from the BIOS flash 11. The BMC 13 thereby recognizes the number of CPUs 3 mounted on the multiprocessor information processing system 1 and the number of mounted DIMMs 5 on the multiprocessor information processing system 1.

In step B15 (corresponding to steps B15-1 and B15-i in FIG. 8 described above), the normality check performer 131 sequentially instructs the CPUs 3 to execute normality check on the CPU from the CPU 3 (in this example, the CPU3-0) with the smallest number. The process of this step will be detailed below with reference to FIG. 10.

In step B17, the failure detector 133 determines whether the CPU instructed to execute normality check replies.

When the CPU 3 replies in step B17 (see Yes route in step B17), the failure detector 133 determines, on the basis of the reply received from the CPU 3, whether the POST is successfully completed in step B19.

When the CPU 3 does not reply in step B17 (see No route in step B17) or when the POST of the CPU 3 is abnormally completed (see No route in step B19), the CPU fallback unit 135 falls back (isolates) the CPU 3 that has not replied or has replied with abnormal completion. The CPU fallback unit 135 writes the values "0" (abnormal) into the normal flags 45 of the CPU 3 and the DIMMs 5 in the CPU/memory configuration table 19.

In step B19, when the POST of the CPU is successfully completed (see Yes route in step B19), the normality check performer 131 determines whether all the CPUs 3 have undergone the normality check.

If a CPU 3 that has not undergone the normality check yet (see No route in step B23), the BMC 13 returns to step B15.

If the normality check of all the CPUs 3 is completed (see Yes route in step B23), the normality check performer 131 instructs normal CPUs 3 to execute memory setting from the CPU 3 with the smallest number in step B23 (corresponding to steps B25-1 and B25-i in above FIG. 8). The procedure of this step will be detailed below with reference to FIG. 11.

In the last step B27 (corresponding to step B27 of above FIG. 8), the BMC 13 instructs the OS to start.

Figure 10:
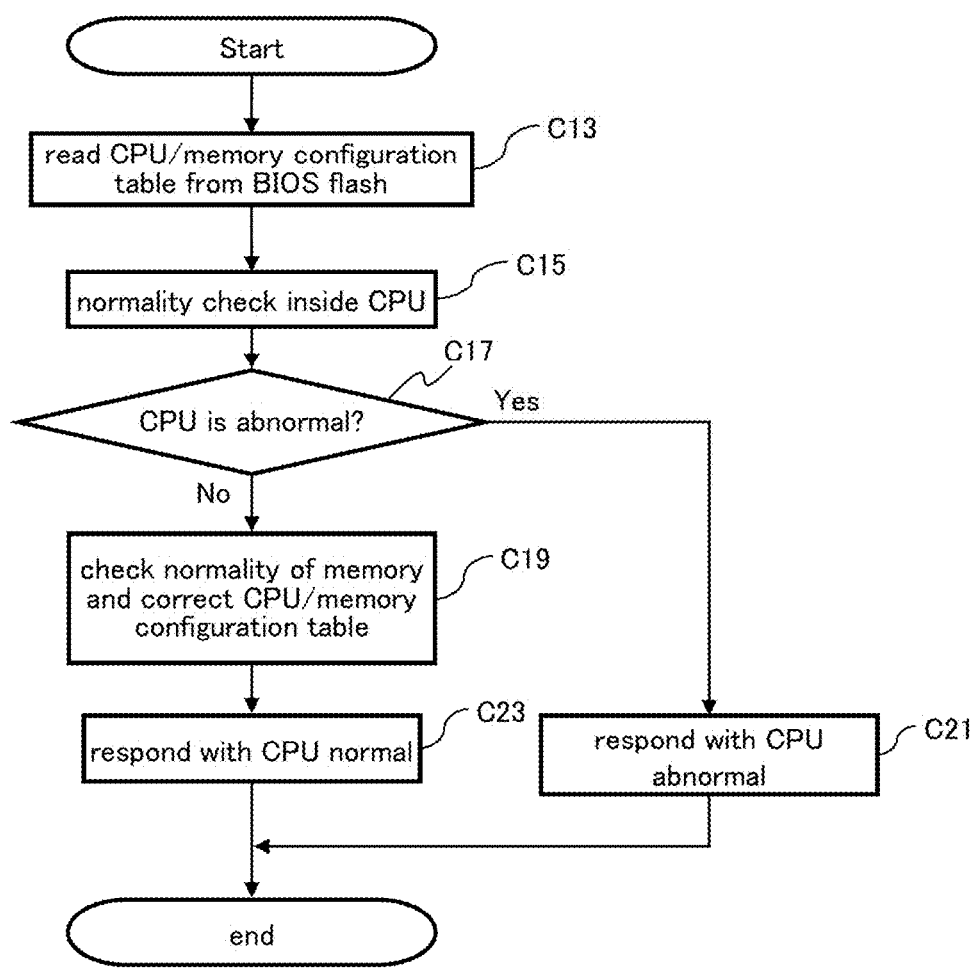
FIG. 10 is a flowchart illustrating an operation performed in normality check on each CPU of a multiprocessor information processing system of an example of the first embodiment.

FIG. 10 is a flowchart illustrating an operation performed in normality checking on each CPU 3 of the multiprocessor information processing system 1 of an example of the first embodiment. The process detailed here corresponds to that performed in steps B15-1 and B15-i of FIG. 8 and step B15 of FIG. 9 that are detailed above.

First of all, the CPU 3 reads the memory mirroring specifying table 17 and the CPU/memory configuration table 19 from the BIOS flash 11 in step C13.

In the next step C15, the CPU 3 carries out normality check inside of the same CPU 3.

In step C17, the CPU 3 determines whether any failure is detected in step C15.

If any failure in the CPU 3 is detected (see Yes route in step C17), the CPU 3 notifies the BMC 13 of the failure of the CPU 3 in step C21.

If no failure is detected in the CPU 3 (see No route in step C17), the CPU 3 checks whether their corresponding DIMMs 5 operate normally and accordingly corrects the CPU/memory configuration table 19 in step C19. Specifically, with respect to the normal DIMMs 5, the value "1" is set in the normal flag 45 associated with each normal DIMM 5 in the CPU/memory configuration table 19. If a failure is detected in a DIMM 5, the value "0" is set in the normal flag 45 associated with the DIMM 5 in the CPU/memory configuration table 19.

In next step C23, the CPU 3 notifies the BMC 13 that the CPU 13 itself is normal.

Figure 11:
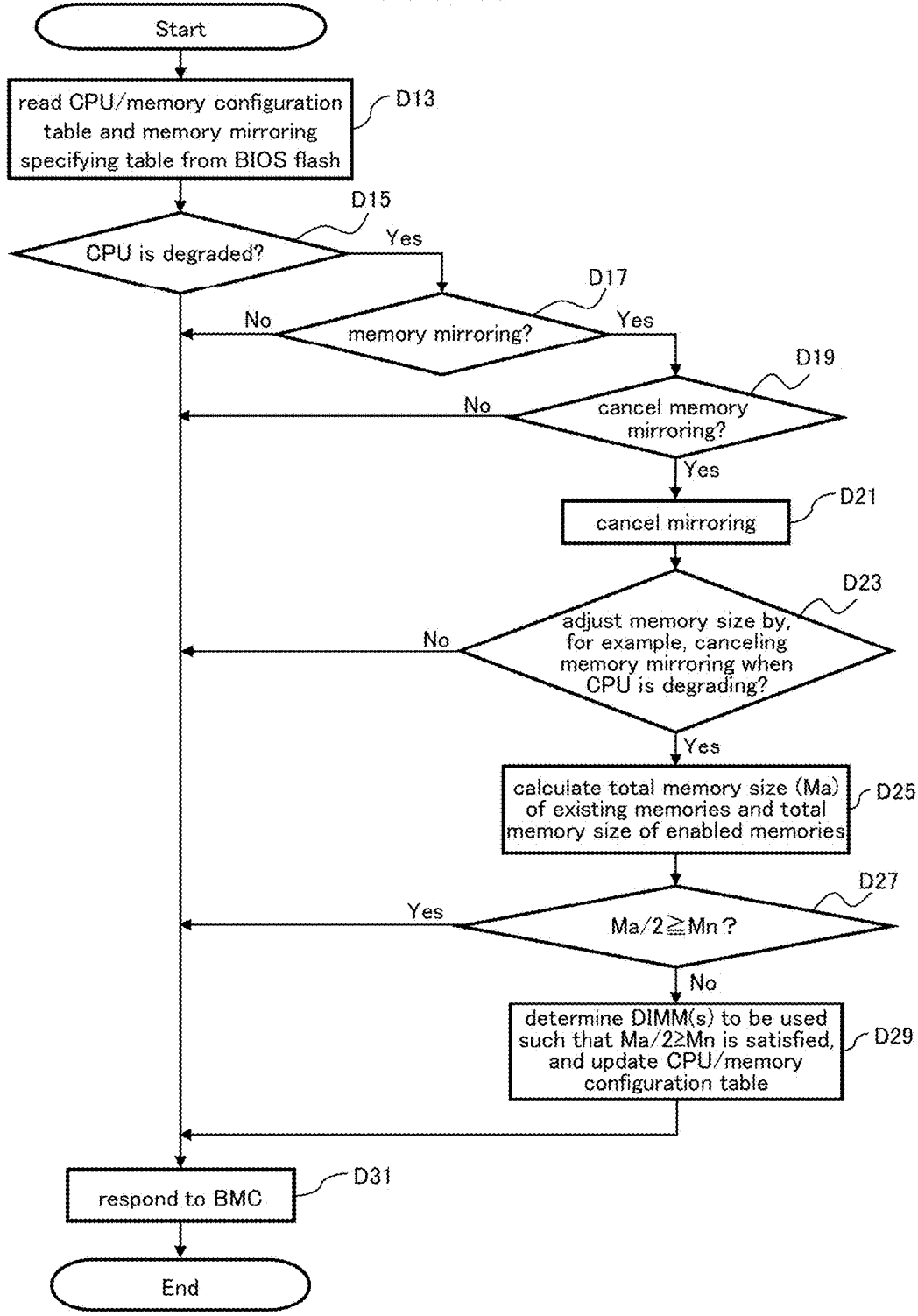
FIG. 11 is a flowchart illustrating an operation performed when the configuration of each memory in a multiprocessor information processing system is changed in an example of the first embodiment.

FIG. 11 is a flowchart illustrating an operation performed when the configuration of each memory in the multiprocessor information processing system 1 is changed in an example of the first embodiment. The process detailed here corresponds to that performed in steps B25-1 and B25-i of FIG. 8 and step B25 of FIG. 9 that are detailed above.

First of all, a CPU 3 reads the memory mirroring specifying table 17 and the CPU/memory configuration table 19 from the BIOS flash 11 in step D13.

In the next step D15, the same CPU 3 determines whether the CPU 3 itself is degraded. This determination can be made using, for example, the result of the normality check of the CPU 3 described above by referring to FIG. 10.

If the CPU 3 is not degraded (see No route in step D15), the procedure moves to step D31. In contrast, if the CPU 3 is degraded (see Yes route in step D15), the mirroring determiner 137 determines whether the DIMMs 5 are duplexed (mirrored) in step D17. This determination is made by, for example, confirming whether the value "1" is set in the memory mirroring flag 31 of the memory mirroring specifying table 17.

When the DIMMs 5 are not mirrored (see No route in step D17), the procedure moves to step D31. In contrast, when the DIMMs 5 are mirrored (see Yes route in step D17), the mirroring cancellation determiner 139 determines whether the memory mirroring is set to be cancelled in the event of fallback of the CPU. The determination is made by, for example, confirming whether the value "1" is set in the memory-mirroring cancelling flag 33 for CPU fallback of the memory mirroring specifying table 17.

When the memory mirroring is not set to be cancelled for CPU fallback (see No route in step D19), the procedure moves to step D31. In contrast, when the memory mirroring is set to be cancelled for CPU fallback (see Yes route in step D19), the mirroring canceller 141 cancels the memory mirroring in step D21. Specifically, the memory mirroring is cancelled by setting the value "0" in the memory mirroring flag 31 of the CPU/memory configuration table 19.

In the next step D23, the memory size adjusting determiner 143 determines whether the memory size is to be adjusted when memory mirroring is cancelled. This determination is made by, for example, confirming whether the value "1" is set in the size adjusting flag 35 when memory mirroring is cancelled of the memory mirroring specifying table 17 described above.

If the memory size is not to be adjusted when memory mirroring cancelled (see No route in step D23), the procedure moves to step D31.

In contrast, when the memory size is to be adjusted when memory mirroring is cancelled (see Yes route in step D23), the memory size calculator 145 calculates the total memory size (Ma) of the DIMMs 5 each having the value "1" in the corresponding presence flag 43 in the CPU/memory configuration table 19 and the total memory size (Mn) of the DIMMs 5 each having the value "1" in the normal flag 45 of the CPU/memory configuration table 19 in step D25.

In the next step D27, the using memory reducer 147 compares the value Mn obtained in step D25 with the value Ma/2 obtained by dividing the total value Ma by two. Ma is divided by two because the available actual memory size is one-half of the total size of the memories mounted in the system 1 when the memories are duplexed.

When the relationship of Ma/2≥Mn is satisfied in step D27 (see Yes route in step D27), the using memory reducer 147 moves the procedure to step D31

If the relationship of Ma/2≥Mn is not satisfied in step D27 (see No route in step D27), the BMC 13 sets the values "0" in the used flags of normal DIMMs 5 connected to a normal CPU 3 one by one to change the contents in the CPU/memory configuration table 19 such that the used DIMMs 5 are reduced until the relationship Ma/2≥Mn is satisfied in step D29. Specifically, the value "1" is set into used flag 49 associated with a DIMM 5 that is not to be used in the CPU/memory configuration table 19.

In the last step D31, the CPU 3 replies to the BMC 13. At that time, the memory mirroring specifying table 17 and the CPU/memory configuration table 19 may be copied into the memory controller 15 in the CPU 3 and also into the BIOS flash 11.

Alternatively, the memory mirroring specifying table 17 and the CPU/memory configuration table 19 in the memory controller 15 and/or the BIOS flash 11 may be updated in each step or at another suitable timing.

Hereinafter, description will now be made in relation to the multiprocessor information processing system 1 according to the first embodiment with reference to FIGS. 12-23.

First of all, the two-CPU multiprocessor information processing system 1 having the smallest configuration will now be made with reference to FIGS. 12-17.

Figure 12:
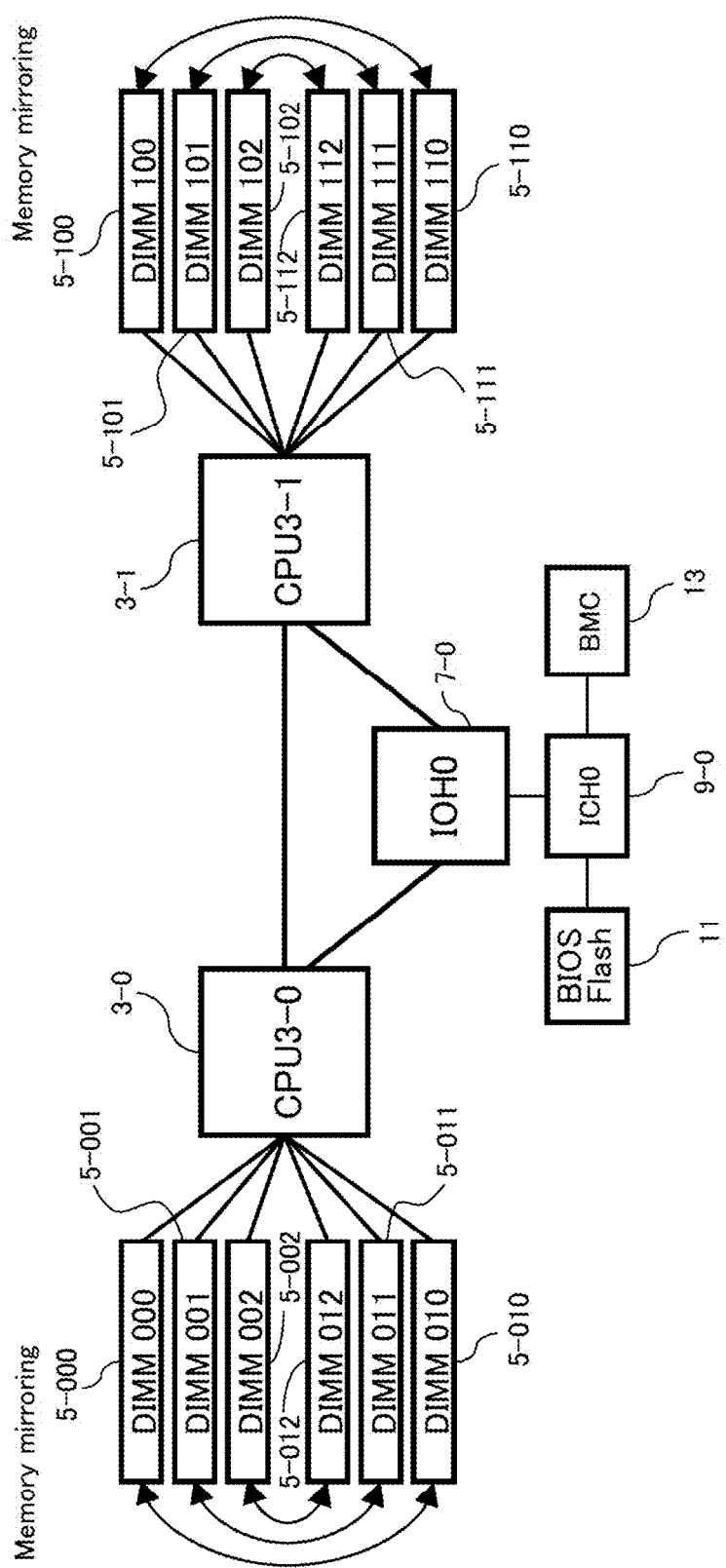
FIG. 12 is a schematic diagram illustrating the configuration of a multiprocessor information processing system having a two-CPU configuration is normally operating.

FIG. 12 is a schematic diagram illustrating the configuration of the multiprocessor information processing system 1 having a two-CPU configuration when being normally operating; FIG. 13 is a diagram illustrating an example of the memory mirroring specifying table 17 under the state of FIG. 12; and FIG. 14 is a diagram illustrating an example of the CPU/memory configuration table 19 under the state of FIG. 12.

Hereinafter, like reference numbers designate the same or the substantially same elements and parts detailed above, so repetitious description is omitted here.

The multiprocessor information processing system 1 assumes that the value "1" is set in the memory mirroring flag 31 of the memory mirroring specifying table 17 stored in the BIOS flash 11 as denoted in FIG. 13. Accordingly, memory mirroring as illustrate in FIG. 12 is set on the respective pairs of DIMMs 5 registered in the CPU/memory configuration table 19 of FIG. 14. Specifically, two DIMMs 5 connected to the same CPU 3 are paired for memory mirroring. For example, under a normal state, the DIMM 5-000 and the DIMM 5-010 are duplexed; the DIMM 5-001 and the DIMM 5-011 are duplexed; the DIMM 5-002 and the DIMM 5-012 are duplexed, so that each DIMM pair functions as a single DIMM. Additionally, the DIMM 5-100 and the DIMM 5-110 are duplexed; the DIMM 5-101 and the DIMM 5-111 are duplexed; the DIMM 5-102 and the DIMM 5-112 are duplexed, so that each DIMM pair functions as a single DIMM.

The actual memory size in this multiprocessor information processing system 1 is one-half of the total memory size of the memories mounted in the system 1 (which corresponds to the memory size of six DIMMs 5).

After the execution of the self test (POST), the memory mirroring specifying table 17 and the CPU/memory configuration table 19 are stored into the BIOS flash 11 and are also copied into the memory controllers 15 of the respective CPUs 3.

Here, it is assumed that a failure occurs in the CPU 3-1 in the example of FIG. 12. Since the OS stops in the event of failure in the CPU 3-1, the multiprocessor information processing system 1 is automatically restarted by the function of Automatic Server Reset and Restart (ASR&R) after a predetermined time passes.

Figure 15:
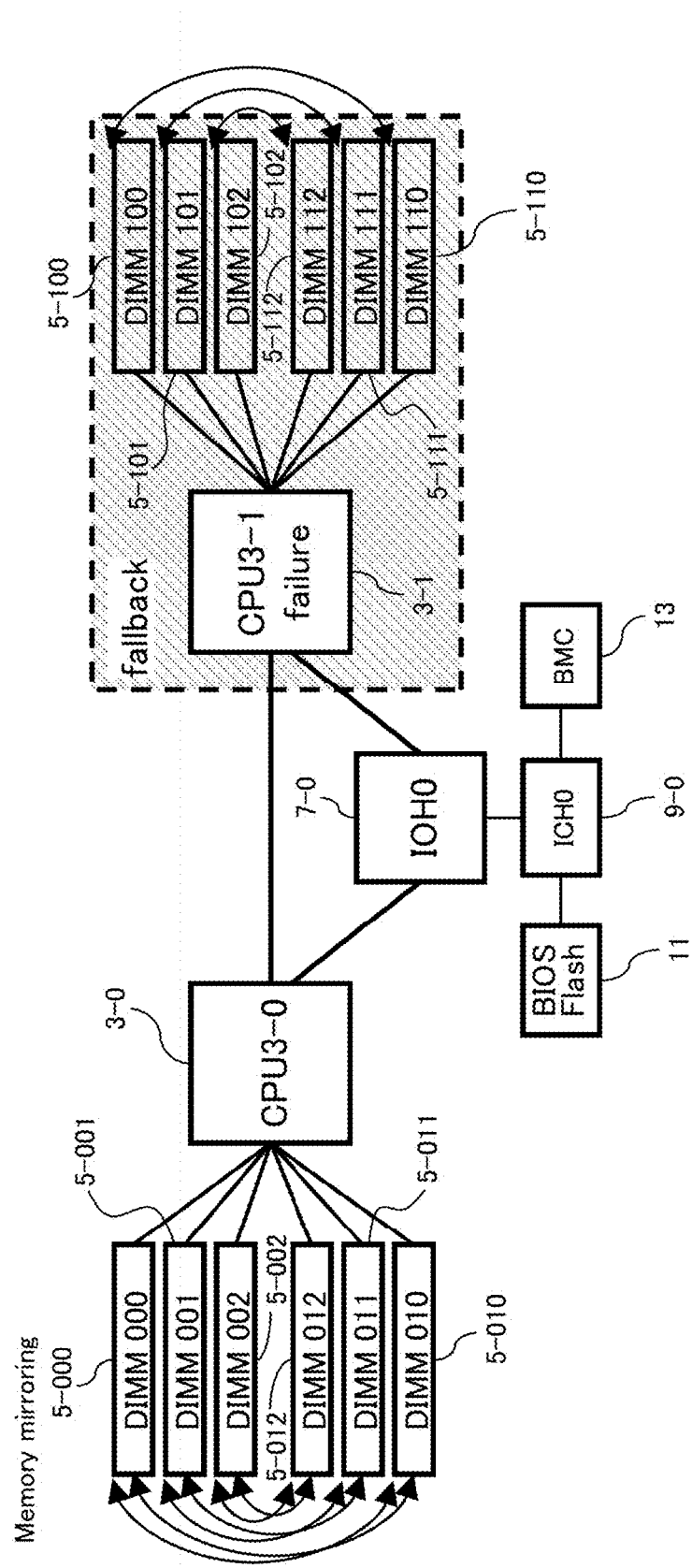
FIG. 15 is a schematic diagram illustrating the configuration of a multiprocessor information processing system when a failure occurs in a CPU.

If the failure in the CPU 3-1 is a permanent failure (on, for example, the fixed wiring), the POST carried out even after the multiprocessor information processing system 1 is restarted detects the same failure in the CPU 3-1, the CPU fallback unit 135 isolates (falls back) the CPU 3-1 as depicted in FIG. 15.

While the multiprocessor information processing system 1 is being started, the mirroring determiner 137 refers to the memory mirroring specifying table 17 and determines whether the value "1" is set in the memory-mirroring cancelling flag 33 for CPU fallback. When the value "1" is set in the flag 33, the mirroring canceller 141 corrects the values of the memory mirroring flags 47 in the CPU/memory configuration table 19 as changed in FIG. 16 in order to cancel the memory mirroring. Specifically, the values in the memory mirroring flags 47 of the CPU0 are changed from "1" to "0".

Figure 17:
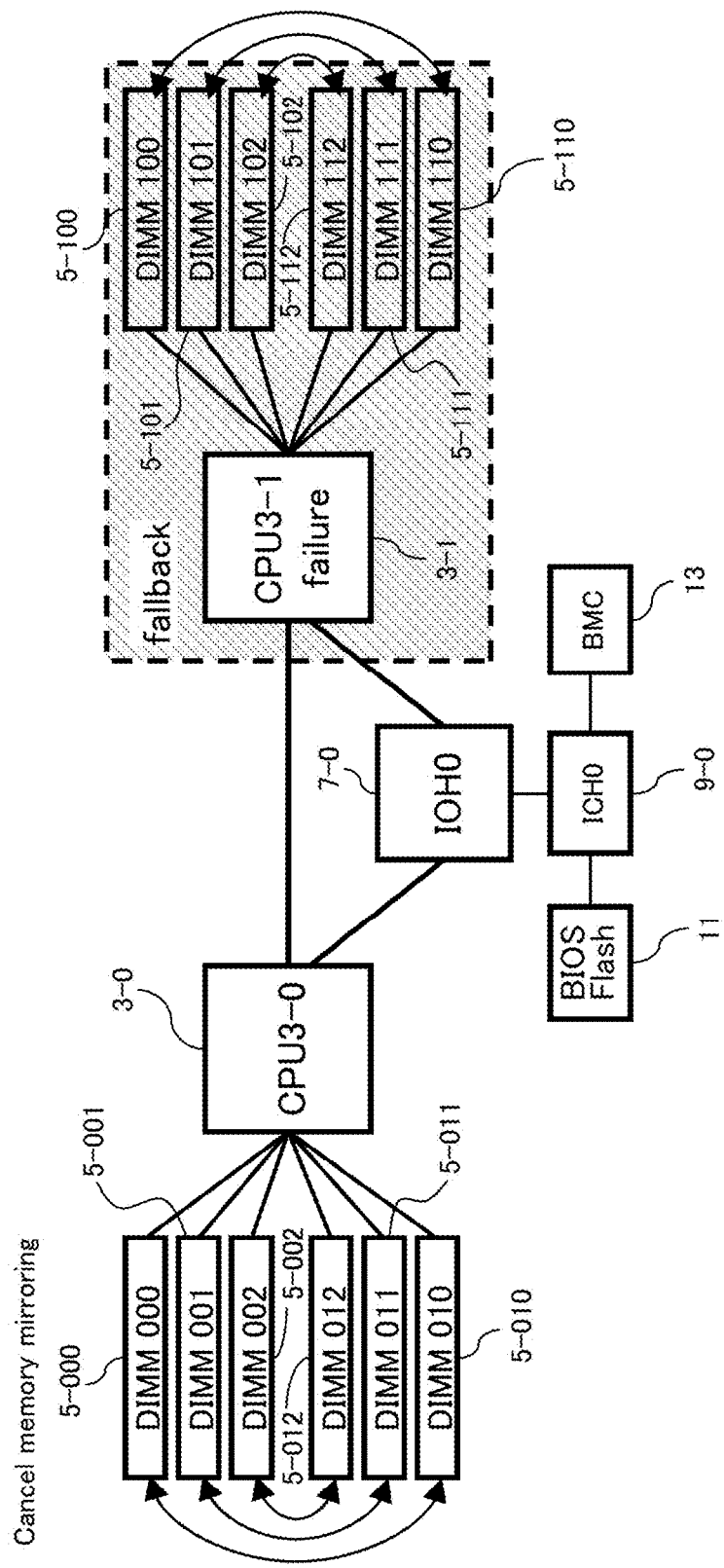
FIG. 17 is a schematic diagram illustrating the configuration of a multiprocessor information processing system after fallback of a CPU.

Then the multiprocessor information processing system 1 is started in the state of depicted in FIG. 17. Specifically, the memory mirroring on the DIMMs 5-000 to 5-0012 is cancelled so that the actual memory size comes to be the memory size of six DIMMs, which is the same as the actual memory size (six DIMMs) before the CPU fallback.

Next, description will now be made in relation to the multiprocessor information processing system 1 including a four-CPU configuration with reference to FIGS. 18-23.

Figure 18:
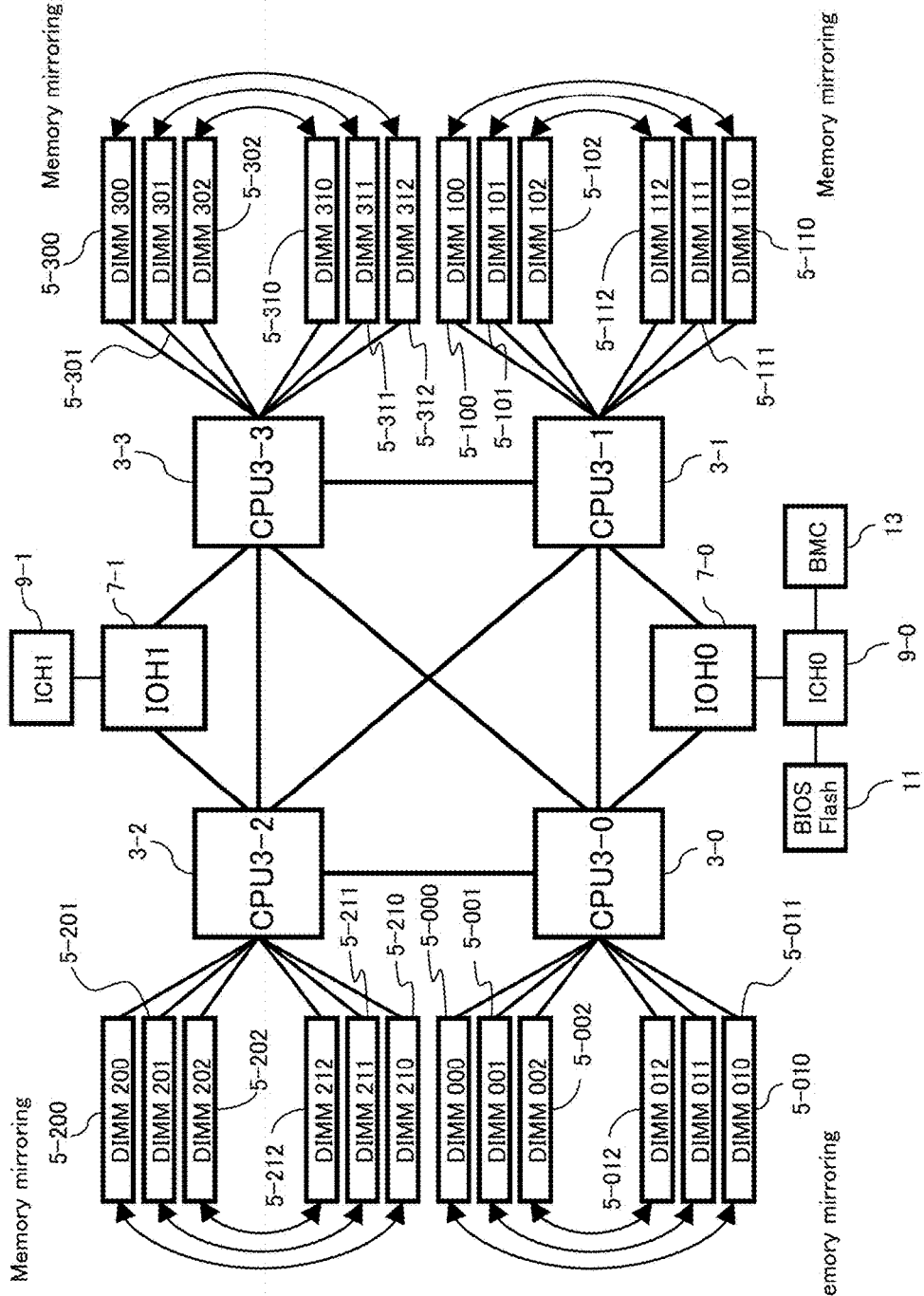
FIG. 18 is a schematic diagram illustrating the configuration of a multiprocessor information processing system having a four-CPU configuration is normally operating.

FIG. 18 is a schematic diagram illustrating the configuration of the multiprocessor information processing system 1 having a four-CPU configuration when being normally operating; FIG. 19 is a diagram illustrating an example of the memory mirroring specifying table 17 under the state of FIG. 18; and FIG. 20 is a diagram illustrating an example of the CPU/memory configuration table 19 under the state of FIG. 18.

The multiprocessor information processing system 1 assumes that the value "1" is set in the memory mirroring flag 31 of the memory mirroring specifying table 17 stored in the BIOS flash 11 as denoted in FIG. 19. Accordingly, memory mirroring as illustrate in FIG. 18 is set on the respective pairs of DIMMs 5 registered in the CPU/memory configuration table 19 as denoted in FIG. 20. For example, under a normal state, the DIMM 5-000 and the DIMM 5-010 are duplexed; the DIMM 5-001 and the DIMM 5-011 are duplexed; and the DIMM 5-002 and the DIMM 5-012 are duplexed, so that each DIMM pair functions as a single DIMM. Additionally, the DIMM 5-100 and the DIMM 5-110 are duplexed; the DIMM 5-101 and the DIMM 5-111 are duplexed; and the DIMM 5-102 and the DIMM 5-112 are duplexed, so that each DIMM pair functions as a single DIMM. The DIMM 5-200 and the DIMM 5-210 are duplexed; the DIMM 5-201 and the DIMM 5-211 are duplexed; and the DIMM 5-202 and the DIMM 5-212 are duplexed, so that each DIMM pair functions as a single DIMM. The DIMM 5-300 and the DIMM 5-310 are duplexed; the DIMM 5-301 and the DIMM 5-311 are duplexed; and the DIMM 5-302 and the DIMM 5-312 are duplexed, so that each DIMM pair functions as a single DIMM.

The actual memory size in this multiprocessor information processing system 1 is one-half of the total memory size of the memories mounted in the system 1 (which corresponds to the memory size of 12 DIMMs 5).

After the execution of the self test (POST), the memory mirroring specifying table 17 and the CPU/memory configuration table 19 are stored into the BIOS flash 11 and are also copied into the memory controllers 15 of the respective CPUs 3.

Here, it is assumed that a failure occurs in the CPU 3-3 in the example of FIG. 18. Since the OS stops in the event of failure in the CPU 3-3, the multiprocessor information processing system 1 is automatically restarted by the function of Automatic Server Reset and Restart (ASR&R) after a predetermined time passes.

Figure 21:
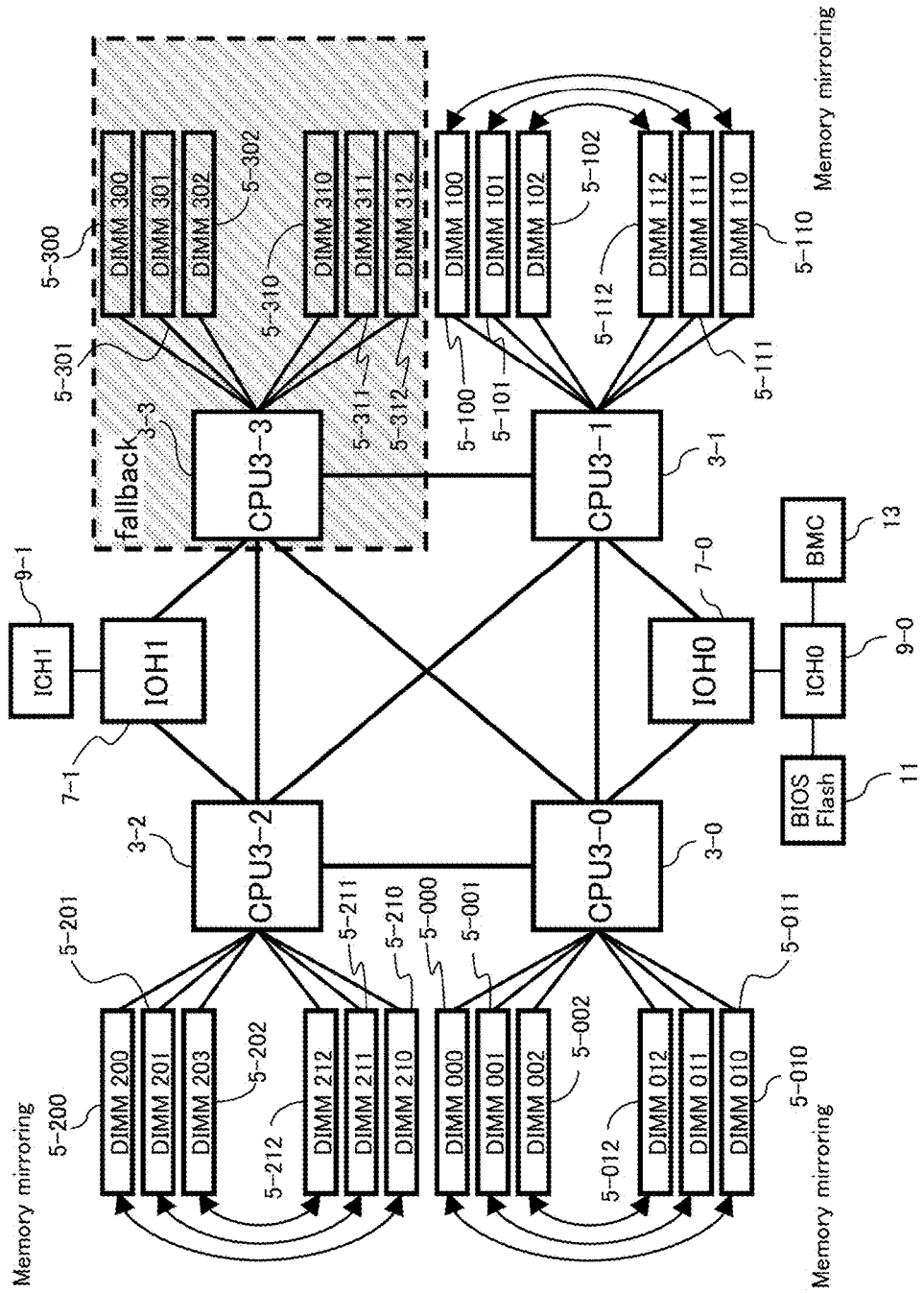
FIG. 21 is a schematic diagram illustrating the configuration of a multiprocessor information processing system when a failure occurs in a CPU.

If the failure in the CPU 3-3 is a permanent failure (on, for example, the fixed wiring), the POST carried out even after the multiprocessor information processing system 1 is restarted detects the same failure in the CPU 3-3, the CPU fallback unit 135 isolates (falls back) the CPU 3-3 as depicted in FIG. 21.

While the multiprocessor information processing system 1 is being started, the mirroring determiner 137 refers to the memory mirroring specifying table 17 and determines whether the value "1" is set in the memory-mirroring cancelling flag 33 for CPU fallback. If the value "1" is set in the flag 33, the mirroring canceller 141 corrects the values of the memory mirroring flags 47 in the CPU/memory configuration table 19 as changed in FIG. 22 in order to cancel the memory mirroring. Specifically, the values in the memory mirroring flags 47 of the CPU0, CPU1, and CPU2 are changed from "1" to "0".

However, as comparing with the configuration before the fallback, cancelling of the memory mirroring results in the memory size of (18) DIMMs 5 connected to the CPU 3-0 to 3-2 to have the actual memory size being larger than that of 12 DIMMs 5 before the fallback of the CPU 3-3.

To solve the above inconvenience, the memory size adjusting determiner 143 determines whether the value "1" is set in the size adjusting flag 35 when memory mirroring is cancelled of the memory mirroring specifying table 17. If the value "1" is set in the flag 35, the using memory reducer 147 falls back part of the DIMMs 5 such that the memory size after the memory mirroring is cancelled approximates to the actual memory size under the memory mirroring before the fallback.

Figure 22:
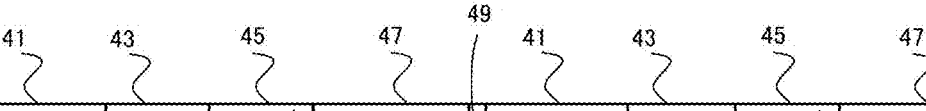
FIG. 22 is a diagram illustrating an example of a CPU/memory configuration table under the state of FIG. 21.

For example, the using memory reducer 147 first falls back DIMMs 5 connected to the CPU 3 with the smallest number, in the order of the DIMM 5 with the largest number, the DIMM 5 paired with the DIMM 5 having the largest number, and the DIMM 5 having the second largest number . . . For example, the using memory reducer 147 selects the DIMM 5-012 connected to the CPU 3-0, the DIMM 5-112 of the CPU 3-1, and the DIMM 5-212 of CPU 3-2. Then, the using memory reducer 147 selects the DIMM 5-002 of CPU 3-0, the DIMM 5-102 of the CPU 3-1, and the DIMM 5-202 of CPU 3-2 that are paired with the DIMMs 5 previously selected. After that, the using memory reducer 147 changes the values of the using flags 49 of the DIMMs 5-012, 5-102, 5-112, 5-202, and 5-212 from "1" to "0", as depicted in FIG. 22.

Figure 23:
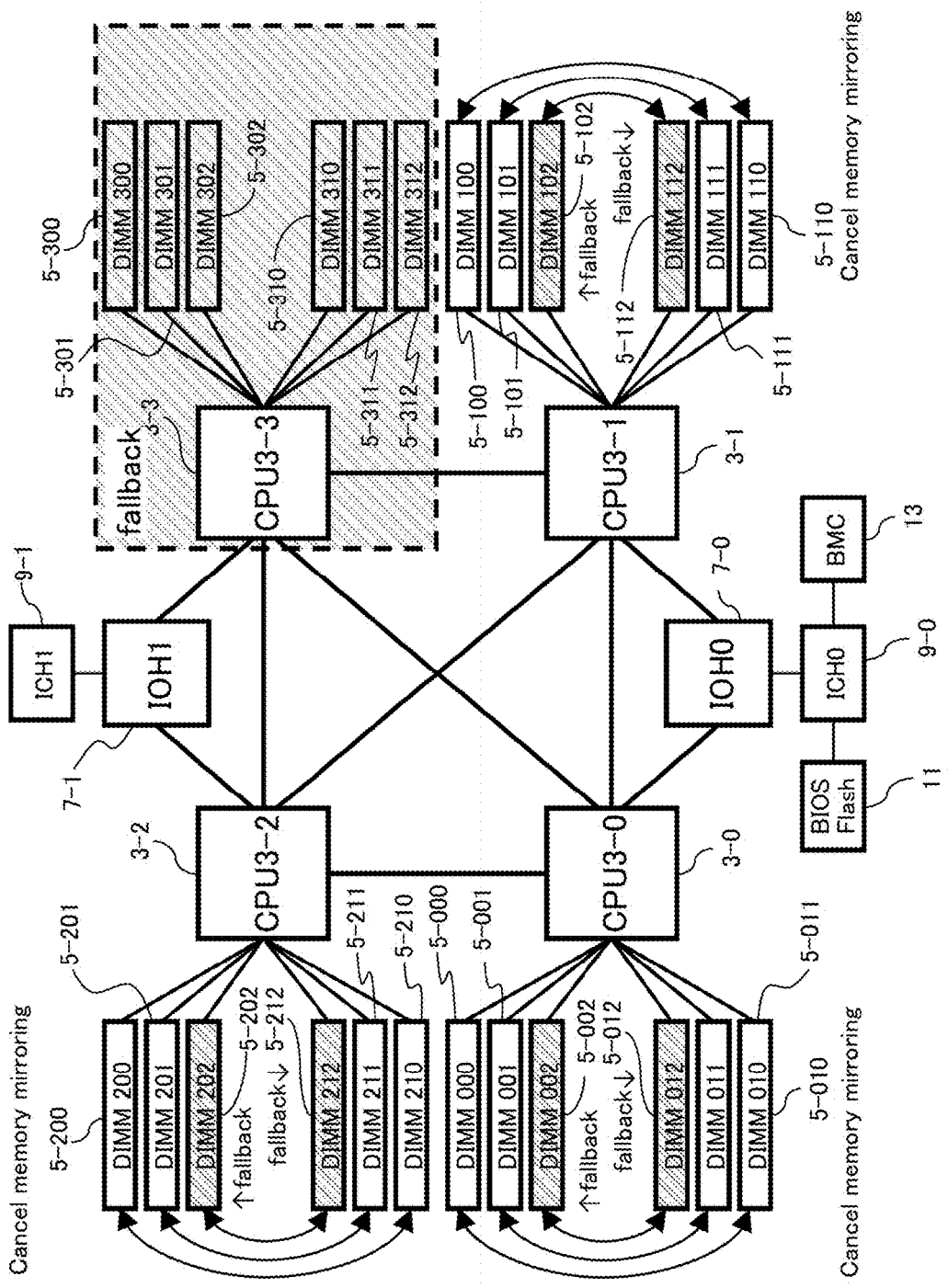
FIG. 23 is a schematic diagram illustrating the configuration of a multiprocessor information processing system after fallback of a CPU and memories.

In this example, the multiprocessor information processing system 1 is started under the state depicted in FIG. 23. Specifically, the memory mirroring of the DIMMs 5-000 to 5-312 is cancelled and also the DIMMs 5-002, 5-012, 5-102, 5-112, 5-202, and 5-212 are degraded. This means that among the DIMMs 5 connected to the CPU0 to the CPU2, two DIMMs 5 for each CPU, i.e. six DIMMs 5 in total, are set to be disabled.

Such restricting the use of DIMMs makes the actual memory size of 12 DIMMs, which is the same as the memory size before the CPU fallback.

Specifying whether each individual DIMM 5 being mounted is to be enabled/disabled can cause the actual memory size to conform to the memory size before the fallback.

As the above, even DIMMs 5 are fallen back due to the fallback of a CPU 3, the first embodiment can increase the available memory size by cancelling the memory mirroring.

Cancelling the memory mirroring can approximate the actual memory size to the memory size before the failure occurs in a CPU.

The multiprocessor information processing system 1 enables the available memory size not to be largely deviated between before and after the fallback of the CPU 3 or before and after recovery from the CPU fallback. This makes it possible to continue the operation of application programs and maintain the performance of the system.

C. Others

In the above first embodiment, the BMC 13 or the CPUs 3 in the multiprocessor information processing system 1 function as the normality check performer 131, the failure detector 133, the CPU fallback unit 135, the mirroring determiner 137, the mirroring cancellation determiner 139, the mirroring canceller 141, the memory size adjusting determiner 143, the memory size calculator 145, and the using memory reducer 147 by executing an information processing program.

The program (information processing program) that achieves the functions of the normality check performer 131, the failure detector 133, the CPU fallback unit 135, the mirroring determiner 137, the mirroring cancellation determiner 139, the mirroring canceller 141, the memory size adjusting determiner 143, the memory size calculator 145, and the using memory reducer 147 are provided in the form of being recorded in a computer-readable recording medium 122, such as a flexible disk, a CD (e.g., CD-ROM, CD-R, and CD-RW), a DVD (DVD-ROM, DVD-RAM, DVD-R, DVD+R, DVD-RW, DVD+RW, and HD DVD), a Blu-ray disk, a magnetic disk, an optical disk, and an magneto-optical disk. A computer reads the program from the recording medium and stores the read program in an internal or external memory device for future use. Alternatively, the program may be recorded in a recording device such as a magnetic disk, an optical disk or a magneto-optical disk, and may be provided from the recording device to the computer via a communication path.

In achieving the functions of the normality check performer 131, the failure detector 133, the CPU fallback unit 135, the mirroring determiner 137, the mirroring cancellation determiner 139, the mirroring canceller 141, the memory size adjusting determiner 143, the memory size calculator 145, and the using memory reducer 147, the processor (in the first embodiment, the BMC 13 or the CPUs 3 of the multiprocessor information processing system 1) reads the program stored in an internal memory device (the BIOS flash 11 or a ROM) and executes the read program. At that time, the computer may read the program stored in the recording medium and execute the read program.

In the first embodiment, a computer is a concept of a combination of hardware and an Operating System (OS), and means hardware which operates under control of the OS. Otherwise, if a program does not need an OS but does operate hardware independently of an OS, the hardware itself corresponds to the computer. Hardware includes at least a microprocessor such as a CPU and means to read a computer program recorded in a recording medium. In the first embodiment, the multiprocessor information processing system 1 has a function of a computer.

The first embodiment is detailed as above. However, the technique disclosed herein is not limited to the foregoing embodiment, and various changes and modifications can be suggested without departing from the gist of the embodiment.

In the first embodiment, the multiprocessor information processing system 1 assumes to have a two- or four-CPU configuration. Alternatively, the system may include any number of CPUs more than two. The number of CPUs is generally a multiple of two (i.e. a power of two), but may be any number.

In the above first embodiment, the memories are assumed to be DIMMs. However, any memory can be used except for a DIMM as far as the memory can be duplexed.

The first embodiment assumes that the DIMMs each have a uniform memory size. The first embodiment can be applied to a system having DIMMs with different memory sizes.

In the first embodiment, the using memory reducer 147 selects prospective fallback DIMMs in the order of a DIMM having a largest number and a DIMM that paired with the DIMM with the largest number connected to a CPU having the smallest number. Alternatively, prospective fallback DIMMs may be selected using a different selecting algorithm.

The above first embodiment manages the configuration of the CPUs and the configuration of the memories collectively in the single CPU/memory configuration table 19. Alternatively, there may be provided a CPU configuration table and a memory configuration table separately.

The first embodiment assumes that an example of redundancy is memory mirroring, but the technique disclosed herein can be applied to any redundancy method.

According to above first embodiment, even when processor fallback accompanies memory fallback, the redundancy of the memories are cancelled to increase the memory size of available memories.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described. Specifically, it should be understood that the various changes, substitutions, and alterations could be made hereto without departing from the spirit and scope of the invention.

What is claimed is:

1. An information processing apparatus comprising:
   a plurality of processors each comprising a plurality of memories and a memory controller that controls the plurality of memories;
   a normality checker that checks whether the plurality of processors operate normally when the information processing apparatus is started;
   a failure detector that finds any failed processor based on a result of the checking by the normality checker;
   a fallback unit that, when one processor of the plurality of processors fails, isolates the failed processor and the plurality of memories of the failed processor;
   a redundancy determiner that determines, when the failed processor is isolated, whether the plurality of memories of other processors are used in a redundancy configuration that makes the plurality of memories redundant;
   a redundancy cancellation determiner that determines, when the redundancy determiner determines that the plurality of memories of the other processors are used in the redundant configuration, whether the redundancy configuration of the plurality of memories of the other processors is to be cancelled to adjust an available memory size; and
   a redundancy canceller that cancels, when the redundancy cancellation determiner determines that the redundancy configuration of the plurality of memories of the other processors is to be cancelled, the redundancy configuration of the plurality of memories of at least one processor operating normally among the plurality of processors.

2. The information processing apparatus according to claim 1, wherein the redundancy cancellation determiner makes the determination based on redundancy cancellation information that specifies whether the redundancy configuration of the plurality of memories of the other processors is to be cancelled.

3. The information processing apparatus according to claim 1, further comprising:
   a size adjusting determiner that determines whether a memory size is to be adjusted;
   a memory size calculator that calculates, when the size adjusting determiner determines that the memory size is to be adjusted, an actual memory size available in the redundancy configuration before the isolation of the failed processor and the plurality of memories of the failed processor, and an available memory size available after the isolation of the failed processor and the plurality of memories of the failed processor; and
   an adjustor that adjusts the expected available memory size available after the isolation of the failed processor such that the expected available memory size approximates to the actual memory size available in the redundancy configuration before the isolation of the failed processor.

4. The information processing apparatus according to claim 3, wherein the size adjusting determiner makes the determination based on size adjusting information that specifies the memory size is to be adjusted.

5. The information processing apparatus according to claim 3, wherein the adjustor reduces an available memory size by disabling part of the plurality of memories.

6. A method of processing information in an information processing apparatus comprising a plurality of processors each comprising a plurality of memories and a memory controller that controls the plurality of memories, the method comprising:
   checking whether the plurality of processors operate normally when the information processing apparatus is started;
   finding any failed processor based on a result of the checking;
   when one processor of the plurality of processors fails, isolating the failed processor and the plurality of memories of the failed processor;
   determining, when the failed processor is isolated, whether the plurality of memories of other processors are used in a redundancy configuration that makes the plurality of memories redundant;
   determining that determines, when the plurality of memories of the other processors are determined to be used in the redundant configuration, whether the redundancy configuration of the plurality of memories of the other processors is to be cancelled to adjust an available memory size; and
   cancelling, when the redundancy configuration of the plurality of memories of the other processors is determined to be cancelled, the redundancy configuration of the plurality of memories of at least one processor operating normally among the plurality of processors.

7. The method according to claim 6, wherein the determination as to whether the redundancy configuration of the plurality of memories of the plurality of processors is to be cancelled is made based on redundancy cancellation information that specifies whether the redundancy configuration of the plurality of memories of the other processors is to be cancelled.

8. The method according to claim 6, further comprising:
   determining whether a memory size is to be adjusted;
   calculating, when the memory size is determined to be adjusted, an actual memory size available in the redundancy configuration before the isolation of the failed processor and the plurality of memories of the failed processor, and an available memory size available after the isolation of the failed processor and the plurality of memories of the failed processor; and
   adjusting the expected available memory size available after the isolation of the failed processor such that the expected available memory size approximates to the actual memory size available in the redundancy configuration before the isolation of the failed processor.

9. The method according to claim 8, wherein the determination as to whether the memory size is to be adjusted is made based on size adjusting information that specifies the memory size is to be adjusted.

10. The method according to claim 8, wherein the adjusting the memory size reduces an available memory size by disabling part of the plurality of memories.

11. A computer-readable recording medium having stored therein a program for information processing that causes an information processing apparatus comprising a plurality of processors each comprising a plurality of memories and a memory controller that controls the plurality of memories to function as:

a normality checker that checks whether the plurality of processors operate normally when the information processing apparatus is started;

a failure detector that finds any failed processor based on a result of the checking by the normality checker;

a fallback unit that, when one processor of the plurality of processors fails, isolates the failed processor and the plurality of memories of the failed processor;

a redundancy determiner that determines, when the failed processor is isolated, whether the plurality of memories of other processors are used in a redundancy configuration that makes the plurality of memories redundant;

a redundancy cancellation determiner that determines, when the redundancy determiner determines that the plurality of memories of the other processors are used in the redundant configuration, whether the redundancy configuration of the plurality of memories of the other processors is to be cancelled to adjust an available memory size; and a redundancy canceller that cancels, when the redundancy cancellation determiner determines that the redundancy configuration of the plurality of memories of the other processors is to be cancelled, the redundancy configuration of the plurality of memories of at least one processor operating normally among the plurality of processors.

12. The computer-readable recording medium according to claim 11, wherein the redundancy cancellation determiner makes the determination based on redundancy cancellation information that specifies whether the redundancy configuration of the plurality of memories of the other processors is to be cancelled.

13. The computer-readable recording medium according to claim 11, wherein the program causes the information processing apparatus to further function as:

a size adjusting determiner that determines whether a memory size is to be adjusted;

a memory size calculator that calculates, when the size adjusting determiner determines that the memory size is to be adjusted, an actual memory size available in the redundancy configuration before the isolation of the failed processor and the plurality of memories of the failed processor, and an available memory size available after the isolation of the failed processor and the plurality of memories of the failed processor; and an adjustor that adjusts the expected available memory size available after the isolation of the failed processor such that the expected available memory size approximates to the actual memory size available in the redundancy configuration before the isolation of the failed processor.

14. The computer-readable recording medium according to claim 13, wherein the size adjusting determiner makes the determination based on size adjusting information that specifies the memory size is to be adjusted.

15. The computer-readable recording medium according to claim 13, wherein the adjustor reduces an available memory size by disabling part of the plurality of memories.

* * * * *